US012769055B2

(12) United States Patent
Steglich et al.

(10) Patent No.: US 12,769,055 B2
(45) Date of Patent: Oct. 20, 2026

(54) INTEGRATED OPTICAL WAVEGUIDE

(71) Applicants: IHP GmbH-Innovations for High Performance Microelectronics/Leibniz-Instit. für innovative Mikroelektronik, Frankfurt (DE); Technische Hochschule Wildau, Wildau (DE)

(72) Inventors: Patrick Steglich, Frankfurt (DE); Christian Mai, Frankfurt (DE); Andreas Mai, Frankfurt (DE); Francesco Villasmunta, Berlin (DE); Claus Villringer, Berlin (DE); Sigurd Schrader, Berlin (DE)

(73) Assignees: IHP GmbH-Innovations for High Performance Microelectronics/Leibniz-Instit. für innovative, Frankfurt (DE); Technische Hochschule Wildau, Wildau (DE)

( * ) Notice: Subject to any disclaimer, the term of this patent is extended or adjusted under 35 U.S.C. 154(b) by 191 days.

(21) Appl. No.: 18/557,444

(22) PCT Filed: Mar. 24, 2022

(86) PCT No.: PCT/EP2022/057803
§ 371 (c)(1),
(2) Date: Oct. 26, 2023

(87) PCT Pub. No.: WO2022/228790
PCT Pub. Date: Nov. 3, 2022

(65) Prior Publication Data

US 2024/0230990 A1 Jul. 11, 2024

(30) Foreign Application Priority Data

Apr. 27, 2021 (EP) .................................... 21170747

(51) Int. Cl.
*G02B 6/122* (2006.01)
*G02B 6/12* (2006.01)
(Continued)

(52) U.S. Cl.
CPC ............ *G02B 6/122* (2013.01); *G02B 6/136* (2013.01); *G02B 6/43* (2013.01); *G02B 2006/12121* (2013.01)

(58) Field of Classification Search
CPC .......... G02B 6/122; G02B 6/136; G02B 6/43; G02B 2006/12121; G02B 6/4214;
(Continued)

(56) References Cited

U.S. PATENT DOCUMENTS 5,761,350 A 6/1998 Koh
8,755,644 B2 * 6/2014 Budd .................. G02B 6/4206 438/31

(Continued)

FOREIGN PATENT DOCUMENTS

WO WO 2022/228790 11/2022

OTHER PUBLICATIONS

Charania et al., "Design, Fabrication, and Comparison of 3D Multimode Optical Interconnects on Silicon Interposer," Journal of Lightwave Technology, vol. 38, No. 13, Jul. 2020, pp. 3454-3460.

(Continued)

*Primary Examiner* — John Bedtelyon
(74) *Attorney, Agent, or Firm* — Sheridan Ross P.C.

(57) ABSTRACT

An integrated optical waveguide formed in a substrate is disclosed. The integrated optical waveguide includes a hole, a core, and one or more bridges. The hole extends in an axial direction of the substrate. The core is made of the same material as the substrate, arranged in the hole, and extends in the axial direction. The core has a first refractive index and a sidewall which is at least partly surrounded by a
(Continued)

surrounding material which has a second refractive index which is lower than the first refractive index and such that a refractive index difference between the first refractive index and the second refractive index allows to guide light within the core. The bridges extend from the sidewall of the core to a sidewall of the hole. The bridges may be made of the same material as the substrate. Furthermore, one or more of the sidewalls of the core, the hole, and the bridges may be tapered sidewalls which include a section which is oblique to the axial direction. Additionally an axial length of one or more of the bridges may be shorter than an axial length of the core.

15 Claims, 18 Drawing Sheets

(51) Int. Cl.
*G02B 6/136* (2006.01)
*G02B 6/43* (2006.01)

(58) Field of Classification Search
CPC ........ G02B 6/4246; G02B 2006/12061; G02B 2006/12123; G02B 6/132; G02B 2006/12107; G02B 6/1223
See application file for complete search history.

(56) References Cited

U.S. PATENT DOCUMENTS

2017/0365725 A1 12/2017 Li et al.
2019/0154933 A1 5/2019 Carothers et al.

OTHER PUBLICATIONS

Mangal et al., "Ball Lens Embedded Through-Package Via to Enable Backside Coupling Between Silicon Photonics Interposer and Board-Level Interconnects," Journal of Lightwave Technology, vol. 38, No. 8, Apr. 2020, 12 pages.
Noriki et al., "Through Silicon Photonic Via (TSPV) with Si Core for Low Loss and High-Speed Data Transmission in Opto-Electronic 3-D LSI," IEEE International 3D Systems Integration Conference (3DIC), Nov. 16, 2010, 4 pages.
Parekh et al., "Electrical, Optical and Fluidic Through-Silicon Vias for Silicon Interposer Applications," IEEE Electronic Components and Technology Conference (ECTC), May 2011, pp. 1992-1998.
Takagi et al., "Low-Loss Chip-to-Chip Optical Interconnection Using Multichip Optoelectronic Package With 40-GB/s Optical I/O for Computer Applications," Journal of Lightwave Technology, vol. 28, No. 20, Oct. 2010, pp. 2956-2963.
Thadesar et al., "Novel Photo-Defined Polymer-Enhanced Through-Silicon Vias for Silicon Interposers," IEEE Transactions on Components, Packaging and Manufacturing Technology, vol. 3, No. 7, Jul. 2013, pp. 1130-1137.
Zhang et al., "Simulation research of high-efficiency unidirectional vertical coupling grating couplers for optical through-silicon vias in 3D optoelectronic integrated circuits," Optics Communications, vol. 479, No. 126408, 2021, 5 pages.
International Search Report and Written Opinion for International (PCT) Patent Application No. PCT/EP2022/057803, dated Aug. 5, 2022, 11 pages.
Extended European Search Report for Europe Patent Application No. 21170747.6, dated Sep. 21, 2021, 7 pages.
Villasmunta et al., "PMMA Filled Through-Silicon Vias (TSVs) and Back Etch Process Controlled by Plasma Emission Interferometry," MikroSystemTechnik Kongress, Oct. 28, 2019, pp. 537-540.
Intent to Grant Europe Patent Application No. 21170747.6, dated Sep. 9, 2025, 5 pages.

* cited by examiner

INTEGRATED OPTICAL WAVEGUIDE

CROSS REFERENCE TO RELATED APPLICATIONS

This application is a national stage application under 35 U.S.C. 371 and claims the benefit of PCT Application No. PCT/EP2022/057803 having an international filing date of 24 Mar. 2022, which designated the United States, and which PCT application claimed the benefit of European Patent Application No. 21170747.6 filed 27 Apr. 2021, the contents of each of which are incorporated herein by reference in their entireties.

The invention regards an integrated optical waveguide, photonic integrated circuits (PICs) including the integrated optical waveguide, and a method for producing the integrated optical waveguide.

The amount of data that every day needs to be computed by data centres and high-performance computing units is vertiginously increasing year by year. Microelectronic industry on the other hand, aims to increase the parallelism in computation by multithreading and multi-core processing. Graphic and microprocessor cores can reach off-chip memory interconnect bandwidth up to 2 Tb/s while on-chip data processing rate can even be of 12.8 Tb/s. The established technology for intra- and interchip communication today is the electrical interconnect. A twofold fundamental problem arises: the required energy necessary to handle such amount of information has reached environmentally significant levels and data throughput will soon not be able to keep up anymore. Global and local interconnects can reach up to 50 km of length in a large-scale integrated chip stacked in several layers. Most of the energy, however, is dissipated not in logic operations, but to transport information i.e. electrical signals in long interconnect lines on the chip and from chip to chip. It is estimated that about 20% of the power is overall lost in connection paths longer than 1 $mm^2$. Metal interconnects have become the limiting factor for the computational performance of electronic systems. As transistors scale becoming smaller and smaller, conventional cop-per interconnects cannot keep pace becoming the bottleneck for further scaling and pre-venting from leveraging the full benefit of these technological advancements. This is known as the “RC Challenge”, in which “R” refers to the electrical resistance of the conductive material and “C” to the capacitance of the line. In particular, the product of these two quantities is closely related to the time required for the conductor to build up the minimum charge to switch on the transistors. This means that a higher RC value slows down the device. Minimizing the RC product is therefore desirable.

A candidate for solving the forementioned problems is represented by photonics. The light carrier strongly reduces power dissipation in long interconnects and allows ultra-high bandwidth. It can offer high performance and take advantage of the well-established complementary metal-oxide-semiconductor (CMOS) technology production processes. Efforts have been already undertaken in this direction and while planar silicon nanophotonic waveguides on Silicon on Insulator (SOI) represent an established research field only few attempts have been made for producing improved vertical optical interconnections using low-k dielectrics and through-silicon vias (TSVs).

Takagi et al., “Low-Loss Chip-to-Chip Optical Interconnection Using Multichip Optoelectronic Package With 40-Gb/s Optical I/O for Computer Applications,” published in J. Lightwave Technol., vol. 28, no. 20, pp. 2956-2963, in October 2010, discloses optical waveguide holes with core-clad structures. These optical waveguide holes achieve a 10-Gb/s/ch chip-to-chip signal transmission. This solution adopted a flip-chip mounting on a land grid array where the optical vias were drilled in. This optical interconnection is not at wafer level but implemented in the optoelectronic package by mechanically drilling holes and filling them with a not specified resins cladding-core system transparent at 850 nm.

Mangal et al., “Ball Lens Embedded Through-Package Via To Enable Backside Coupling Between Silicon Photonics Interposer and Board-Level Interconnects,” published in J. Lightwave Technol., pp. 1-1, in 2020, discloses ball lenses embedded into an organic package where the vias have been laser-drilled. The vias obtained in this way had a diameter of about 300 μm, which allowed a compatible micro ball lens to be embedded. The thickness of the substrate was 400 μm. The integration density obtainable is rather limited, but the alignment tolerance is favoured. Light is coupled into the vias from a top stacked silicon photonics interposer with input waveguides by means of a grating coupler. The outcoming beam is then reflected into a polymer waveguide in the board-level substrate by means of metallized mirror. In this case a coupling efficiency of −3.4 dB at 1310 nm was obtained across the optical interfaces.

Parekh et al., “Electrical, optical and fluidic through-silicon vias for silicon interposer applications,” published in 2011 IEEE 61st Electronic Components and Technology Conference (ECTC), Lake Buena Vista, FL, USA, May 2011, pp. 1992-1998 discloses an approach on the wafer-level. It shows a silicon interposer with electrical, fluidical and optical vias. Highly anisotropic etching methods are used for the simultaneous fabrication of the three different TSVs typologies. The core-cladding system is composed by a 2 μm thick silicon dioxide external layer and a SU-8 polymer filling which is UV-exposed after spin coating deposition. SU-8 shows good optical transmission properties in the 850 nm wavelength window. The refractive indexes of $SiO_2$ and SU-8 are respectively 1.54 and 1.588 at 830 nm. These optical TSVs are multimode having a 118 μm core diameter and 300-400 μm depth. The measured average losses are higher for the polymer-filled vias (0.59 dB) compared to the same empty vias (0.53 dB). The higher losses for the filled vias were mostly attributed to imperfect coupling and impedance mismatch.

Thadesar et al., “Novel Photo-Defined Polymer-Enhanced Through-Silicon Vias for Silicon Interposers,” published in IEEE Trans. Compon., Packag. Manufact. Technol., vol. 3, no. 7, pp. 1130-1137, July 2013, presented a similar approach on the wafer level and pointed out the importance of the impedance matching at the end of the via to efficiently outcouple the transmitted light.

Charania et al., “Design, Fabrication and Comparison of 3D Multimode Optical Interconnects on Silicon Interposer,” published in J. Lightwave Technol., pp. 1-1, 2020, discloses differences between three different approaches: unfilled, metal coated and filled vias with a diameter of 50 μm and a pitch of 250 μm in a 380 μm thick Si wafer at the back end of the line (BEOL) of the chip fabrication. The optical characterization is carried on both for 660.5 nm and 1550 nm (telecom) wavelengths. The air filled vias have a thin layer of $SiO_2$ on the sidewalls and show the highest losses of about 0.8 dB. The metal coated vias with a thin layer (10 nm) either of Ru or TiN have losses of about 0.4-0.5 dB. The best results are achieved by the polymer filled vias, which use Ormocore as a light confinement medium with a thermally grown $SiO_2$ cladding layer. In this case, lightwaves are guided by total internal reflection. The refractive index contrast is $\Delta n=0.1$ and provides a NA=0.55. The losses in this case are as small as 0.1 dB over 380 μm for both the tested wavelengths. The data transmission was also tested at 850 and 1550 nm and measured to be error-free (Bit error rate$<10^{-12}$) up to 40 Gbit/s. The polymer filled structures showed in this study appeared to be stable in their transmission characteristics after being tested again one year later.

U.S. Pat. No. 8,755,644 B2 shows an annular via etched in silicon to obtain a silicon post which can act as a core for a vertical cylindrical waveguide. Its sidewalls can be covered by one or more layers of lower refractive index materials to act as a cladding for a discrete index gradient waveguide.

It is an object of the invention to provide an improved integrated optical waveguide with high mechanical stability and good performance which is easier to produce and a corresponding improved method for producing the integrated optical waveguide.

This object is achieved by an integrated optical waveguide formed in a substrate which includes a hole, a core, and one or more bridges. The hole extends in an axial direction of the substrate. The core is arranged in the hole. The core extends in the axial direction, has a first refractive index, and has a sidewall which is at least partly surrounded by a surrounding material having a second refractive index which is lower than the first refractive index and such that a refractive index difference between the first refractive index and the second refractive index allows to guide light within the core. The core is made of the same material as the substrate. The one or more bridges extend from the sidewall of the core to a sidewall of the hole.

The integrated optical waveguide may provide a good performance, for example, carry in On-Off-Keying modulation (OOK) a single channel data rate of up to 42 Gbit/s contributing to a total bandwidth density of 1 Tbps/mm$^2$ given a pitch of 200 μm.

Since one or more bridges connect the core with the sidewall of the hole, mechanical stability of the integrated optical waveguide may be increased. An increasing number of bridges increases mechanical stability, but may deteriorate performance of the integrated optical waveguide.

Since the substrate around the hole and the core are made of the same material, an easier production with reduced costs may be achieved. Etching in the substrate removes bulk material corresponding to a surrounding of the waveguide structure and not the material corresponding to the waveguide structure itself. In particular, the structure of the integrated optical waveguide is compatible with "Via-first, -middle and -last" approaches, as well as with SOI wafer technologies and CMOS technologies. In contrast, for example, to prior art waveguides which use polymers as core. Furthermore the integrated optical waveguide allows long-term stability.

The integrated optical waveguide allows connecting active devices, such as VCSELs, light emitting diodes (LEDs), or the like, and passive devices, such as photo detector (PD), grating couplers, or the like. Transducing devices such as VCSELs and PDs allow converting signals from electrical to optical or vice versa. These devices can be driven at very high speeds and easily outperform the current bandwidth limitations used in electronics.

Furthermore, a sidewall roughness of the integrated optical waveguide may be reduced. The sidewall roughness is an important geometrical characteristic that affects the performance of silicon photonics integrated vias due to reduced transmission losses in silicon waveguides. Smoothing the sidewalls allows reducing losses by a degree of magnitude. This may allow leveraging ultra-low energy interconnections, especially by avoiding back scattering phenomena and enhancing mode coupling.

The hole may serve as a via, e.g., a through-silicon via (TSV). The integrated optical waveguide may be an optical through-silicon waveguide (OTSW). The axial direction may be the direction of the optical axis. This allows guiding light along the optical axis by the core of the integrated optical waveguide.

The substrate may be made of a material that is transparent enough to transmit light of a selected wavelength and that may be processed by wet etching, dry etching, laser drilling, focused ion beam or another processing method for forming the integrated optical waveguide in the substrate. The core may be adapted for guiding signals of a wide range of wavelengths for which the material of the substrate is sufficiently transparent. The material of the substrate may include or be, for example, silicon (Si), germanium (Ge), indium phosphide (InP), silicon germanium (SiGe), gallium arsenide (GaAs), glass, quartz, sapphire, or silicon carbide (SIC). The substrate may be bulk-Si.

The substrate may, for example, be a wafer, such as a Si wafer, e.g., a SOI wafer. Si has a refractive index $n_{st}=3.48$, is transparent to near-infrared radiation and in particular to the 1550 nm fiber optics telecommunication laser light.

The refractive index difference is a measure of the difference between $n_1$ the refractive index of the core and $n_2$ the refractive index of the surrounding material. In this text, the refractive index difference is defined as the difference between the refractive index of the core and the refractive index of the surrounding material, i.e., $\Delta n=n_1-n_2$. Another measure for the relative difference in refractive index of the core and the surrounding material is the refractive index contrast defined as $$\Delta = \frac{(n_1^2 - n_2^2)}{2n_1^2}.$$

The refractive index difference may be, for example, between 0.001 to 4. Lower or higher values are also possible, depending on the wavelength that is selected to be guided by the core, single-/multimode operational requirements, and size of the structures of the integrated optical waveguide, i.e., the core, the hole, and the one or more bridges. In a case in which, for example, the substrate is made of Si and the surrounding material is made of air with a second refractive index of $n_{air}=1$, the refractive index difference is 2.48 and the refractive index contrast is $\Delta=0.46$. In this case, because of the size of the structures a multimode strongly guiding waveguide may be provided. To support single mode operation with the same refractive index difference, a core diameter of less than 1 μm would be required, which may not be feasible production-wise. On the other hand, a single mode waveguide may be produced with larger core dimensions, e.g., of above 10 μm by a refractive index difference of 0.0001, for example, by using as the surrounding material a doped Si or poly-Si cladding and as the substrate monocrystalline Si.

The hole may extend from a top of the substrate. Alternatively, or additionally, the hole may extend to a bottom of the substrate. The hole may extend, for example, from the top of the substrate to the bottom of the substrate. This allows providing an optical connection from one side of the substrate to the other side of the substrate. Since the integrated optical waveguide may provide an efficient optical connection between the top and the bottom of the substrate, inter- and intra-chip optical links may be provided. This may allow an improved data rate and connection density, e.g., in a three-dimensional (3D) packaged structure.

The one or more bridges may extend from the core in a direction perpendicular to the axial direction such that the one or more bridges connect the core with the sidewall of the hole. This may allow to further improve mechanical stability.

The one or more bridges may be made of the same material as the substrate. Since the substrate around the hole, the one or more bridges, and the core are made of the same material, an easier production with reduced costs may be achieved. Furthermore, the integrated optical waveguide allows direct coupling from SOI waveguides. Since the one or more bridges extend from the core to the sidewall of the hole, the one or more bridges may be used as a support for planar optical waveguides or couplers on their top surfaces from a top surface of the substrate to a top surface of the core. This may be achieved by further etching steps and may allow a seamless interconnection between horizontal dimension and vertical dimension. These connections may be achieved monolithically, for example, by using a SOI wafer as substrate, such that a seamless and monolithical coupling between surfaces of the integrated optical waveguide may be achieved. Since, for example, the top surfaces of the substrate around the hole, the core, and the one or more bridges may be further processed by common CMOS manufacturing methods, many different couplers may be supported on the surface such as diffraction grating couplers, photonic crystals, metamaterials, or the like. The one or more bridges may also support on their top surfaces any planar structure that may be etched on it.

Alternatively, the one or more bridges may be made of a different material. One or more of the bridges may also be made of the same material as the substrate and one or more other bridges may be made of the different material. The one or more bridges made of the different material may be, for example, produced by etching the hole and the core into the substrate, filling the hole around the core with the different material and then etching the one or more bridges into the different material arranged in the hole around the core in a subsequent step. The production may involve different masks, e.g., photomasks, for the different etching steps.

The shape of the hole, the core, and the one or more bridges may be freely designed with the restriction that the core needs to be able for guiding the light. This allows flexibility in adapting the integrated optical waveguide to a specific application, e.g., for operating with one or more other devices. The specific application may be, for example, an intra- or inter-chip optical interconnection, or a photonics 3D-integration, such as stacking of multiple chips and connecting them by the integrated optical waveguide or multiple integrated optical waveguides. The shape of the one or more bridges and the core may be adapted, for example, for guiding only a certain polarization of the light. This may allow adapting the shapes of the core and the bridges for specific applications.

The hole may be a cylindrical hole. The sidewall of the cylindrical hole may be vertical. The cylindrical hole may have a form of a right circular cylinder or any other cylinder, e.g., an elliptical cylinder, or a hexagonal shaped cylinder.

The core may extend parallel to the sidewall of the cylindrical hole. The core may be arranged in a center of the cylindrical hole. The core may have a cylindrical profile.

The sidewalls of the core, the hole, and the one or more bridges may be parallel to the axial direction. In other words, the sidewalls may be vertical. This allows easy processing of the substrate for producing the integrated optical waveguide.

One or more of the sidewalls of the core, the hole, and the one or more bridges may be tapered sidewalls which include a section which is oblique to the axial direction. In other words, the core, the hole, and/or the one or more bridges may have a tapered sidewall or tapered sidewalls including a section that is tapered. The section of the tapered sidewalls may extend over a part of an axial length of the core, the hole, and/or the one or more bridges, or over the entire axial length. This may allow to provide a tapered or respectively, conical profile. Using tapered sidewalls may allow providing mode size conversion. The tapered sidewalls may also include two or more sections with different slopes or taper angles, respectively. The taper angle of the section of the tapered sidewalls may be positive or negative. In other words, the sections of the sidewalls may be tapered negatively, i.e., an area of a top slice of a respective section may be larger than an area of a bottom slice of the respective section, or positively, i.e., an area of the top slice of the respective section may be smaller than an area of the bottom slice of the respective section. If, for example, the section extends over the entire axial length, providing the hole with a negatively tapered sidewall allows providing a positively tapered waveguide with a top diameter larger than its bottom diameter and vice versa. A different diameter of the core at a top and bottom of the waveguide may provide mode size conversion. This structure supports bidirectional operation. This effect may be exploited for a more effective coupling of beams large in diameter, e.g., in a range above 1000 nm provided by external optical fibers or vertical-cavity surface-emitting lasers (VCSELs) with SOI planar optical waveguides which have a much smaller size, e.g., in a range of below 1000 nm. For example, instead of coupling of external light sources with photonics integrated circuits (PICs) by a long planar tapered waveguide with a diffractive element at its end which occupies 12×400 μm on a surface of the substrate, e.g., wafer, the waveguide may be reduced to the size of a silicon wire with about 400 nm. This allows avoiding large losses which would result by coupling the core of an external single mode waveguide with about 10 μm in diameter with the photonic nanowire due to the large size mismatch.

The one or more of the tapered sidewalls may have, for example, a vertical initial section and a vertical final section or in other words non-tapered initial and final sections and a tapered section in between the initial and final section. This may improve a coupling efficiency both at the waveguide's input and output.

The tapering angle of the section of the one or more tapered sidewalls may be, for example, about 1°. This allows minimizing radiative losses and power leakage. Furthermore, this allows removing long tapered planar optical waveguide from the surface of a chip and to move it into the substrate in form of an integrated optical waveguide. For example, the tapered planar optical waveguide may be reduced in size since most of the mode size conversion may be performed in the integrated optical waveguide. Furthermore, a coupler, e.g., grating coupler, needs to be just as large as the tip of the core of the tapered integrated optical waveguide. This allows providing a coupler, e.g., smaller than 10 μm. This may allow reducing space occupied by the coupler and the planar optical waveguide.

Alternatively, or additionally, at least one of the one or more bridges may extend parallel to the core in the axial direction over its entire axial length.

The surrounding material may be air. This may allow a high refractive index difference.

The surrounding material may include a cladding covering one or more of the sidewalls of the hole, the core, and the one or more bridges. The cladding may include one or more materials including $SiO_2$ which has a refractive index of $n_{SiO_2}=1.44$, silicon nitride ($Si_3N_4$) or poly-Si. Using a cladding instead of, for example, air allows to prevent an evanescent wave to spread and be transmitted across a whole chip in which the integrated optical waveguide may be included. Instead the evanescent wave is transmitted only within the hole which allows limiting occasional optical cross-talk in different photodetectors (PDs) arranged above different integrated optical waveguides on the substrate. Furthermore, thermal growth of $SiO_2$ may allow reducing roughness of the sidewalls and thus improving waveguiding applications. This is especially true if the integrated optical waveguide is produced by the so-called Bosch process, which is multiplexed and leaves a characteristic periodical structuring on the sidewalls known as scalloping.

The cladding may be doped, e.g., in-situ doped. This allows the cladding to be more conductive.

The surrounding material may include one or more layers, e.g., one or more claddings made of different materials, e.g., double clad fibers. The surrounding material may include, for example, a cladding and a layer of air. Alternatively, or additionally, the surrounding material may include a stabilisation material arranged between a first layer of surrounding material arranged at least partly on the sidewall of the core and the sidewall of the hole. The stabilisation material may have a high stability. The stabilisation material may have a lower refractive index than the first layer of surrounding material. Providing a stabilisation material may allow to further increase the mechanical stability of the integrated optical waveguide.

An axial length of the hole may be identical to an axial length of the core. Additionally, or alternatively, an axial length of the bridge may be identical to the axial length of the core.

An axial length of one or more of the one or more bridges may be shorter than an axial length of the core. This allows providing one or more suspended bridges.

The core may have an axial length in the axial direction depending on a thickness of the substrate. The axial length of the core may be, for example, up to 1000 μm, preferably between 350 μm and 750 μm. An aspect ratio and dimension of the core, i.e., in-plane size compared to axial size, e.g., diameter compared to axial length, may depend on a mask undercut of a mask used for producing the core and the hole, as well as possible tapering.

The one or more bridges may have an axial length such that the sidewall of the core is entirely surrounded by the surrounding material at its tip. The tip of the core may be arranged at a top or a bottom of the core. For example, all of the bridges may have axial lengths such that the sidewall of the core is entirely surrounded by the surrounding material at its tip. This may allow reducing optical losses.

If a width of the one or more bridges is smaller than a width of the core, in case of tapering, the one or more bridges vanish at a certain depth, depending on a slope of the sidewalls. An axial length of the one or more suspended bridges may be tuned by designing a proper hole size and shape. During the production of the integrated optical waveguide by etching, an ion angular distribution, i.e., an angle at which accelerated ions hit a surface of the substrate, depends also on the width of the hole. When all the other parameters of the etching process are fixed, smaller holes will generally have a smaller slope, while larger holes have a larger slope. In this way, the slope of the sidewall of the bridge and its height may be further tuned.

A width of the core at a respective junction connecting the one or more bridges may be larger than a width of the one or more bridges. For example, for a core in form of a right circular cylinder, the width of the core corresponds to a circular diameter. The circular cylindrical hole diameter may be, for example, 200 μm. The core, for example in right circular cylindrical form, may have a diameter between 500 nm and 50 μm, e.g., between 500 nm and 1000 nm, or 5 μm and 50 μm, or 20 μm and 50 μm. Larger core diameters allow improving optical fibre coupling or optical communication device coupling, e.g., VCSEL coupling, offering a larger numerical aperture at the cost of a slightly reduced bandwidth.

The dimension and aspect ratio of the core may be adapted based on an application, e.g., intra- or inter-chip optical interconnections, photonics 3D-integration, such as stacking of multiple chips and connecting them by integrated optical waveguides.

The hole, the core, or the hole and the core may an oblique cylinder form. This may improve coupling with a coupler, e.g., a grating coupler, since a directionality of the diffracted light may be almost completely in the waveguide direction. The oblique cylinder form may be produced, for example, if the substrate is slightly tilted in a plasma anisotropic etching process. The hole may also have, for example a tapered oblique cylinder form.

A roughness of one or more of the sidewalls of the hole, the core, and the one or more bridges may be reduced by deep reactive ion etching (DRIE). Optionally, the deep reactive ion etching may be followed by wet etching. For example, Bosch etching followed by wet etching may be used or cryo-etching may be used. Cryo-etching allows obtaining smooth sidewalls without the need of a subsequent wet etching step. Alternatively, crystal orientation dependent etching may be used. This may allow to reduce sidewall roughness and thus to reduce optical losses in the integrated optical waveguide through roughness of the sidewalls. Root mean square (RMS) roughness of the sidewall may be, for example, below 100 nm measured by Critical dimension Scanning electron microscope (CD-SEM) method.

The crystal orientation dependent etching may include using a crystalline Si wafer with (110) plane exposed on the surface and forming the hole, the core, and the one or more bridges into the substrate by deep reactive ion etching such that their geometry follows the <112> directions on the surface of the wafer and such that vertical (111) planes are aligned below and applying a chemical alkaline solution to wet etch the sidewall roughness. The chemical alkaline solution may be, for example, potassium hydroxide (KOH) or tetramethyl ammonium hydroxide (TMAH). This allows exposing the vertical (111) planes of the crystal lattice.

An impedance matching layer may be arranged on top of the core. The top of the core may correspond to a port of the integrated optical waveguide. This may allow minimizing reflections and thus reduce coupling losses. For example, a direct and effective coupling of the integrated optical waveguide on its top either with an external optical fiber or another integrated photonics component, such as a VCSEL, a PD, or a waveguide, may be achieved. The impedance matching layer may be made of, for example, $SiO_2$, $Si_3N_4$ or any other suitable material which allows reducing reflections and effectively coupling with an external optical fiber or another integrated photonics component. In other words, the impedance matching layer may be an anti-reflection coating. The impedance matching layer may, for example, be applied on the substrate before producing the integrated optical waveguide, i.e., before etching a hole with core into the substrate.

In a further aspect of the present invention a PIC is presented. The PIC comprises a planar optical waveguide and the integrated optical waveguide according to at least one of the claims 1 to 8, or any embodiment of the integrated optical waveguide. The planar optical waveguide is arranged on one of the one or more bridges extending from the substrate to the core.

The planar optical waveguide may be, for example, arranged directly on a top surface of the bridge or may be arranged in a layer, e.g., a passivation layer deposited on the bridge. The planar optical waveguide may be made of, e.g., the same material as the substrate, for example, Si. The planar optical waveguide may be tapered in the planar direction, e.g., depending on the size of the one or more bridges and/or the size of the core at the surface on which the planar optical waveguide is arranged.

The planar optical waveguide may, for example, be a rib, slab, or strip waveguide. For example a rib waveguide may allow larger core dimensions for single-mode (SM) operation regime.

The planar optical waveguide may be terminated by a coupler on top of the core. The coupler may include or be, for example, a diffractive coupler, a grating coupler, a Bragg grating coupler, a mirror coupler, a prism coupler, a photonic crystal, a ball lens, a polymer waveguide, a wire, or any other type of coupler configured for coupling an optical signal between an integrated optical waveguide and a planar optical waveguide. The coupler allows deflection of a beam direction of the light from vertical to horizontal and vice versa. The coupler may be covered by an impedance matching layer, e.g., made of a reflective material such as a metal. This may allow to enhance the deflection effect and reduce optical losses.

The PIC may comprise several waveguides, e.g., several integrated optical waveguides and/or planar optical waveguides. The waveguides may be terminated by couplers in order to allow coupling the waveguides with each other.

In a further aspect of the present invention another PIC is presented. The PIC comprises two integrated optical waveguides according to at least one of the claims 1 to 8 or any embodiment of the integrated optical waveguide, a VCSEL, a PD, a driver, two couplers, and a planar optical waveguide. The two integrated optical waveguides are both formed in a substrate. Each of the two integrated optical waveguides extends in axial direction from a first surface of the substrate to a second surface of the substrate. The VCSEL is configured for providing an optical signal. The VCSEL is arranged on the first surface of the substrate above the core of one of the two integrated optical waveguides. The PD is configured for receiving the optical signal. The PD is arranged on the first surface of the substrate above the core of the other one of the two integrated optical waveguides. The driver is configured for driving the VCSEL. The driver is arranged on the first surface of the substrate. Each of the two couplers is arranged on the second surface of the substrate above the core of one of the two integrated optical waveguides. Each of the couplers is configured for coupling an optical signal between one of the two integrated optical waveguides and the planar optical waveguide. The planar optical waveguide is arranged on the second surface of the substrate and connects the two couplers.

The integrated optical waveguides may include one or more tapered sidewalls of their holes, their cores, and/or their one or more bridges. This may allow providing mode size conversion from one surface of the substrate, e.g., a Si wafer, to the other surface of the substrate.

In a further aspect of the present invention a method for producing an integrated optical waveguide in a substrate is presented. The substrate has a first refractive index. The method comprises the steps:

- etching the integrated optical waveguide with an anisotropic plasma process in an axial direction into the substrate such that
  - a hole extends in the axial direction of the substrate,
  - a core of the substrate is arranged in the hole, the core extending in the axial direction, and having a sidewall which is at least partly surrounded by a surrounding material having a second refractive index which is lower than the first refractive index and such that a refractive index difference between the first refractive index and the second refractive index allows to guide light within the core, and
  - one or more bridges are extending from the sidewall of the core to a sidewall of the hole.

This allows providing a fully CMOS compatible production method for an integrated optical waveguide. The integrated optical waveguide may be directly integrated into chip fabrication by a TSV first, middle or last process flow and it is compatible to 3D or 2.5D architectures. Furthermore, it offers a monolithically integrated solution for the coupling of external sources to PICS, e.g., made from Si, from the back of the substrate, e.g., a wafer, such as a Si wafer, for example, a SOI wafer.

The method allows removing bulk material corresponding to a surrounding of the waveguide structure and not the waveguide structure itself. Consequently, most of the etching constraints, especially regarding difficulties to etch high aspect-ratio structures, are released and only related with the wished structure density. Since the one or more bridges extend from the sidewall of the core to the sidewall of the hole, mechanical stability may be improved, in particular compared to an OTSW structure in which an annular core is provided without bridges. In other words, the bridges connect the core with the sidewall of the hole improving the mechanical stability.

Etching the integrated optical waveguide with an anisotropic plasma process in the axial direction into the substrate may include arranging a mask, e.g., a photo mask, such as a $SiO_2$ mask, above the substrate and etching the hole, the core, and the one or more bridges into the substrate using the mask. Providing a mask allows protecting the core and optionally also the one or more bridges from being removed while material around them is removed by the etching process.

The one or more bridges may be made of the material of the substrate. Alternatively, the hole may be filled by a different material and the one or more bridges may be produced in a subsequent etching step in which the different material is etched from the hole around the one or more bridges. The integrated optical waveguide may also include one or more bridges made of the same material as the substrate and one or more bridges made of the different material.

DRIE of full-thickness bulk-Si or a SOI wafer may be performed in order to obtain the integrated optical waveguide, e.g., in form of a step-index waveguide. The method may be employed during the back end of the line (BEOL) processing steps. The method allows to efficiently provide an optical connection from one side of a chip to the other side of the chip.

The method may include a step of providing the surrounding material including a material deposited by plasma enhanced chemical vapour deposition (PECVD), deposited by low pressure chemical vapour deposition (LPCVD), deposited by physical vapor deposition (PVD), or grown by thermal oxidation.

The surrounding material deposited by PECVD may include one or more of silicon nitride ($Si_xN_y$, e.g., $Si_3N_4$), silicon oxynitride ($SiO_xN_y$), SiC, and amorphous silicon ($\alpha$-Si). Alternatively, LPCVD may be used for depositing the surrounding material including, for example, $SiO_2$ by using tetraethoxysilane (TEOS) as a precursor, phosphosilicate glass, nitrides and oxynitrides. Also physical vapor deposition (PVD) techniques may be used for depositing the surrounding material, e.g., by depositing a thin layer as a seed that may be further grown by electro-chemical plating, for example, if the seed is metallic.

The surrounding material may be a cladding. The cladding may be made of $SiO_2$. The $SiO_2$ may be deposited by PECVD using TEOS or grown by thermal oxidation.

Alternatively, the cladding may be made of poly-Si deposited by low pressure chemical vapour deposition (LPCVD). This allows for a larger core dimension. Furthermore, this may allow to ensure light confinement for single mode operation regime thanks to a low refractive index difference.

The method may include doping the surrounding material. Alternatively, the surrounding material may be in situ doped. This allows improving the conductivity of the surrounding material.

A thickness of the cladding may be selected, such that it contains evanescent waves whose penetration depth in the cladding is smaller than a wavelength unit. For example, the thickness of the cladding may be above 1 μm.

In case that the cladding is grown by thermal oxidation, i.e., a thermally grown layer, width of the core, e.g., a diameter, may be reduced by some hundred nanometres since the cladding partially grows towards the outside of the core and partially towards the inside of the core.

The method may include filling of a remaining space between the cladding and the sidewall of the hole by another material, e.g., a stabilisation material. This may allow to enhance mechanical stability. In this case, for example, bridges of smaller size may be used in combination with the stabilisation material. The stabilisation material may be, for example, a polymer. The stabilisation material may have a lower refractive index than the cladding. The stabilisation material may be deposited, for example, by spin coating, e.g. vacuum spin coating, or any other suitable method. The stabilisation material may include or be, Poly(methyl methacrylate) (PMMA), polycarbonate (PC), or polyurethane (PU). The stabilisation material may not be a high-grade optical material and/or may be amorphous.

The method may further include one or both of the steps:

- etching the one or more bridges in order to provide a planar optical waveguide on the one or more bridges and
- etching the core in a manner to diffractively structure a surface of the core in order to provide a coupler configured for coupling an optical signal into the integrated optical waveguide.

Etching the integrated optical waveguide in an axial direction into the substrate may be performed by crystal orientation dependent etching or DRIE. For example, cryo-etching or Bosch etching may be performed.

Cryo-etching employs a $SF_6$ and $O_2$ etchant gases combination in a single step process. This allows reducing roughness of the sidewall of the hole. Furthermore, this allows a very high tunability of a tapering angle depending on a relative amount of oxygen in the gas mixture and on the substrate temperature.

DRIE may be followed by wet etching. This may allow smoothening the roughness of the sidewalls. Cryo-etching allows producing smooth sidewalls without a subsequent wet etching step. Wet etching may be optionally performed for further smoothening of the sidewalls after cryo-etching was performed. Alternatively, etching the integrated optical waveguide into the substrate may include Bosch etching. Performing the Bosch etching process leaves a characteristic periodical structuring on the sidewalls known as scalloping In order to smoothen the roughness of the sidewalls, wet etching may be performed subsequently.

The crystal orientation dependent etching may include using a crystalline Si wafer with (110) plane exposed on the surface and forming the hole, the core, and the one or more bridges into the substrate by deep reactive ion etching such that their geometry follows the <112> directions on the surface of the wafer and such that vertical (111) planes are aligned below and applying a chemical alkaline solution to wet etch the sidewall roughness. The chemical alkaline solution may be, for example, KOH or TMAH. This allows exposing the vertical (111) planes of the crystal lattice.

It shall be understood that the integrated optical waveguide of claim 1, the PIC of claim 9, the PIC of claim 11, and the method of claim 12 have similar and/or identical preferred embodiments, in particular, as defined in the dependent claims.

It shall be understood that a preferred embodiment of the present invention can also be any combination of the dependent claims or above embodiments with the respective independent claim.

The present invention will be more fully understood from the following detailed description of embodiments thereof, taken together with the drawings in which.

Photonics is expected to become in the future the new computation paradigm. The transition from the electronic domain to the optical one takes place by an intermediate step which is regarded as optoelectronics. In this environment, data are still processed mainly by CMOS transistor technology, but interconnections can already rely on transducing devices such as VCSELs and PD which convert the signal from electrical to optical. These devices can be driven at very high speeds and easily outperform current bandwidth limitations of electronics.

In the following with reference to the figures, OTSW technology is described. Various embodiments of integrated optical waveguides, e.g., in form of step-index waveguides obtained by DRIE of full-thickness bulk silicon or SOI wafers, are shown. Such manufacturing method may be employed during the back end of the line (BEOL) processing steps. The production method efficiently allows optical connection from one side of a chip to the other side. The bridged OTSW may be used, for example, in electro-optical interconnection in PICs or 3D packaging of CMOS chips.

Figure 1:
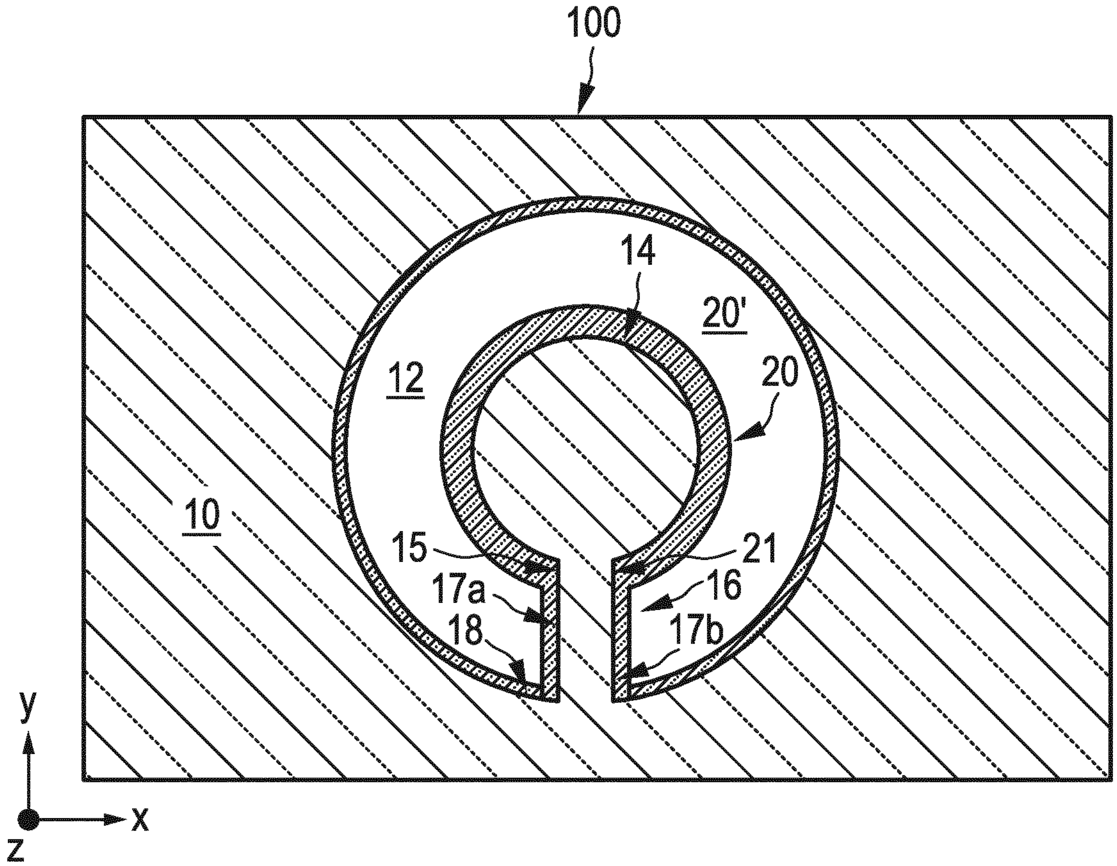
FIG. 1 shows exemplarily and schematically a horizontal cross-sectional view of a first embodiment of a bridged OTSW.

FIG. 1 shows a first embodiment of an integrated optical waveguide in form of a bridged OTSW 100 in a horizontal cross-sectional view, i.e., in the x-y plane. The bridged OTSW 100 is formed in a substrate in form of Si wafer 10. In other embodiments, another substrate made of another substrate material may be used.

The bridged OTSW 100 includes a hole 12, a core 14, a bridge 16, and a surrounding material formed by a cladding 20 and air 20'. The hole 12, the core 14, and the bridge 16 extend in an axial direction z of the Si wafer 10.

In this embodiment, the hole 12 and the core 14 have a right circular cylindrical form. In other embodiments, the hole, the core, or the hole and the core may also have, for example, an oblique cylinder form.

The bridge 16 extends from a sidewall 15 of the core 14 to a sidewall 18 of the hole 12 in a direction perpendicular to the z-direction, i.e., in the orientation of FIG. 1 this is the y-direction.

The cladding 20 is deposited on the sidewall 15 and 18, as well as on sidewalls 17*a* and 17*b* of the bridge 16. Air 20' fills the remaining space of the hole 12. In other embodiments, another surrounding material may be used. For example, another cladding material may be used such as $Si_3N_4$ or the surrounding material may be formed by air.

In this embodiment, the core 12 and the bridge 16 are made of Si, i.e., they are made of the same material as the substrate 10. This allows easy production of the bridged OTSW 100 which may be etched into the Si wafer 10 using an anisotropic plasma process, e.g., crystal orientation dependent etching or DRIE, such as cryo-etching, or Bosch etching, possibly followed by wet etching for reducing roughness of the sidewalls 15, 17*a*, 17*b*, and 18.

In this embodiment, the core 14 is arranged in a center of the hole 12. In other embodiments, the core 14 may also be arranged at another position within the hole 12.

The sidewall 15 of the core 14 is partly surrounded by the cladding 20. The core 14 is not surrounded by the cladding 20 at its junction 21 to the bridge 16.

The core has a first refractive index of $n_{Si}=3.48$ at a wavelength of 1550 nm. The cladding 20 has a second refractive index of $n_{SiO_2}=1.44$. Thus the second refractive index is lower than the first refractive index and the refractive index difference between the first refractive index and the second refractive index of 2.04 allows to guide light within the core 14. Guiding of the light is achieved according to the same working principle as for optical fibers and dielectric waveguides. There are two mediums of different refractive index, i.e., the core 14 and the cladding 20. The real part of the refractive index in the central region, i.e., the core 14 is higher than the one of the surrounding region, i.e., the cladding 20. Therefore, the light in the near IR range for which Si is transparent can be confined and propagated with low losses from one end of the bridged OTSW 100 to the other.

Figure 2:
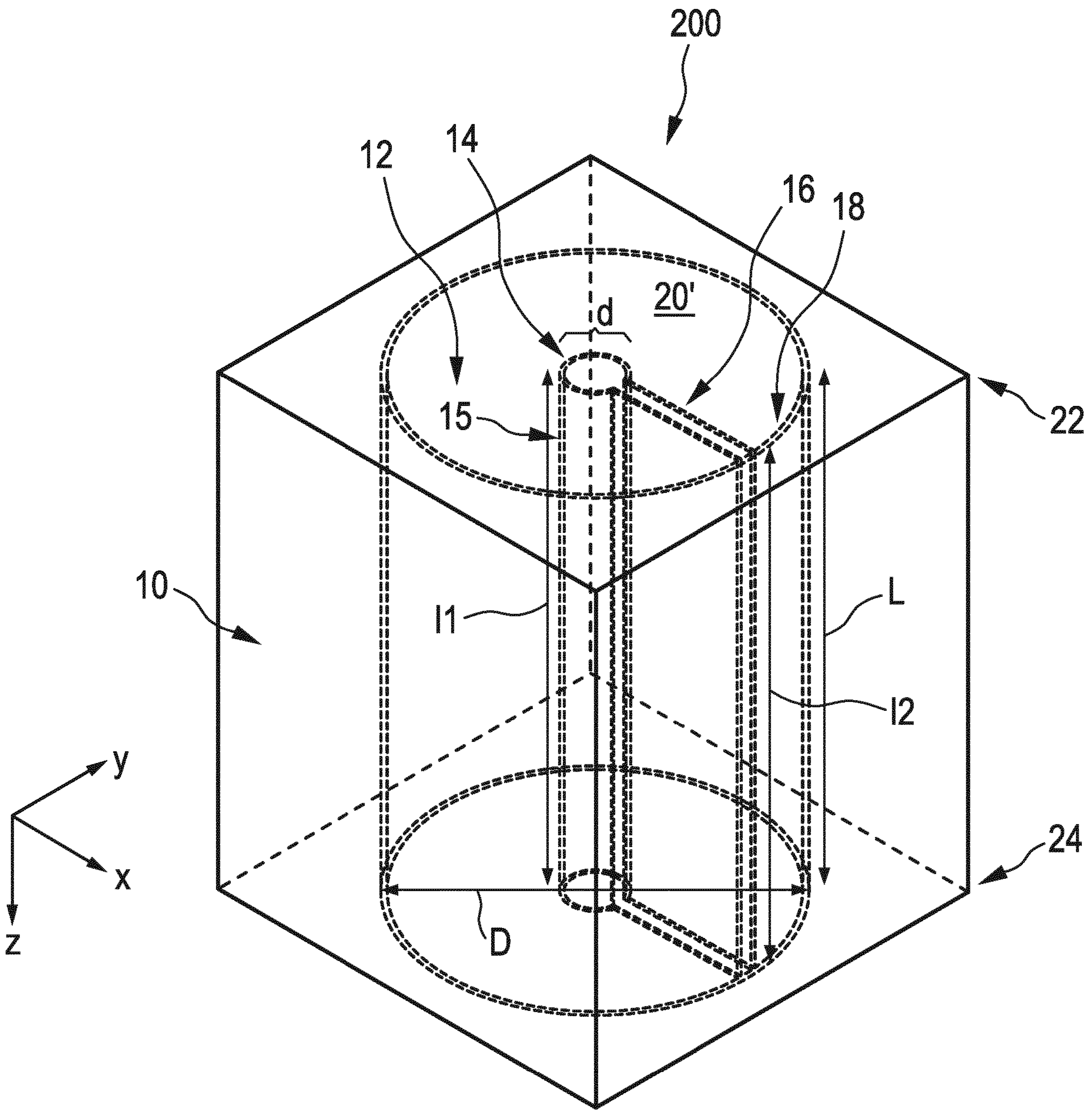
FIG. 2 shows exemplarily and schematically a perspective view of a second embodiment of the bridged OTSW.

FIG. 2 shows a perspective view of a second embodiment of the integrated optical waveguide in form of a bridged OTSW 200. The bridged OTSW 200 is similar to the bridged OTSW 100. Same reference signs are used for same features. In contrast to the bridged OTSW 100, the bridged OTSW 200 has no cladding and the surrounding material is formed by air 20'.

The bridged OTSW 200 is formed in a substrate in form of a Si wafer 10. The bridged OTSW 200 has a hole 12 in which a core 14 and a bridge 16 are arranged. The bridge 16 extends from a sidewall 15 of the core 14 to a side wall 18 of the hole 12. The hole, 12, the core 14, and the bridge 16 extend in an axial direction z of the Si-wafer 10. In this embodiment, they extend from a top 22 to a bottom 24 of the Si wafer 10. This allows an optical interconnection from one side, e.g., the top 22 to the other side, e.g., the bottom 24, of the Si-wafer 10.

In this embodiment, the hole 12 and the core 14 have a right circular cylindrical form. In other embodiments, they may have another form.

In this embodiment, the hole 12 has a diameter D of 200 μm. The core 14 has a diameter d of 5 μm. The diameters D and d may depend on an application of the integrated optical waveguide. The diameter d may, for example be between 500 nm and 50 μm, e.g., between 500 nm and 1000 nm, or 5 μm and 50 μm, or 20 μm and 50 μm. In other embodiments, in which the hole and/or core have another from than right circular cylindrical a width, size, and/or shape of the core and/or hole may also be adapted to an application.

Furthermore, the hole 12 has an axial length L of 500 μm. The axial length may depend on a thickness of the substrate and may be, for example, between 200 μm and 1000 μm, e.g., between 350 μm and 750 μm. The core 14 has an axial length l1 which is identical to the axial length L. The bridge 16 has an axial length l2 which is identical to the axial lengths l1 and L in this embodiment. In other embodiments, l2 may also be shorter than l1, such that a suspended bridge may be provided.

In this embodiment, the diameters D and d are constant along the entire axial lengths l1 and L. In other embodiments, the diameters D and d may be variable along the z direction, e.g., in case that the sidewalls are tapered sidewalls. In that case one or more sections of the tapered sidewalls may be oblique to the z direction.

Figure 3:
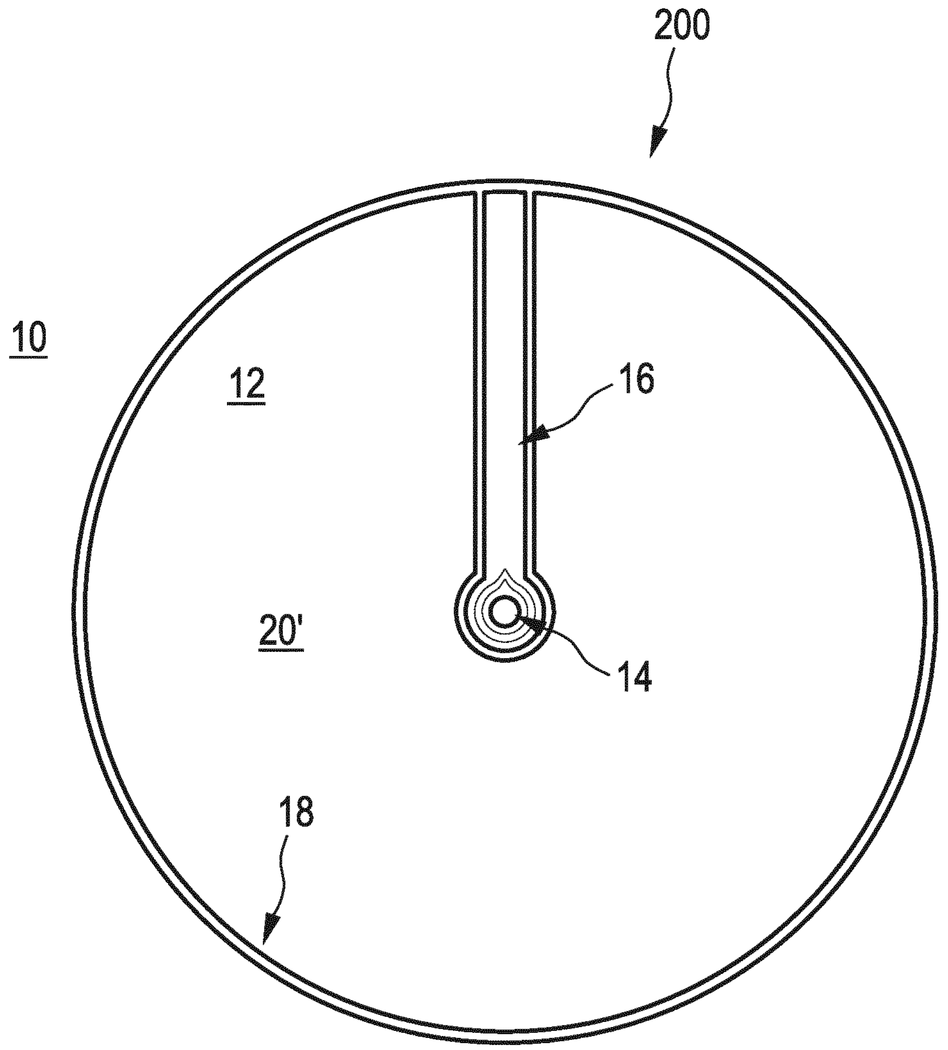
FIG. 3 shows a horizontal cross-sectional view of a normalized electric field simulation for the second embodiment of the bridged OTSW.

FIG. 3 shows a normalized electric field simulation for the bridged OTSW 200 presented in FIG. 2. The field is strongly confined within a perimeter of the core 14 of the bridged OTSW 200 while nearly no field is present in the surrounding air 20' included in the hole 12 or the bridge 16. Therefore light propagates with low losses through the core 14.

Figure 4:
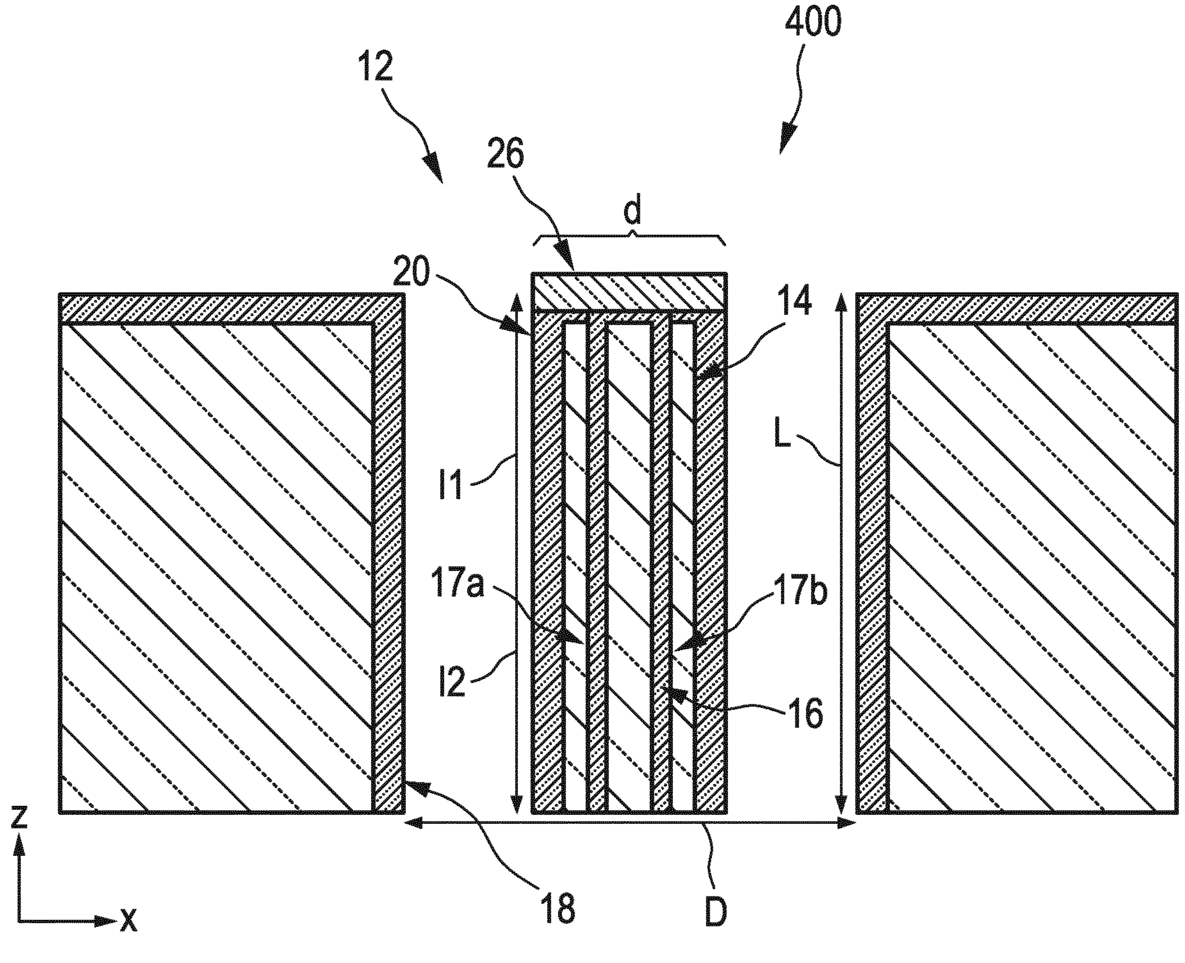
FIG. 4 shows exemplarily and schematically a vertical cross-sectional view of a third embodiment of the bridged OTSW.

FIG. 4 shows a vertical cross-sectional view of a third embodiment of the bridged OTSW 300. The bridged OTSW 300 is similar to the bridged OTSW 100 presented in FIG. 1. Same features are again referred to by same reference signs. The bridged OTSW 300 additionally has an impedance matching layer in form of an anti-reflection coating 26 on its top. This allows enhancing impedance matching with VCSELs or PDs which may be arranged above the core 14.

In this embodiment, the anti-reflection coating 26 is made of $SiO_2$. The impedance matching layer may also be made of, for example, $Si_3N_4$ or any other suitable material which allows reducing reflections and effectively coupling with an external optical fiber or another integrated photonics component.

Figure 5:
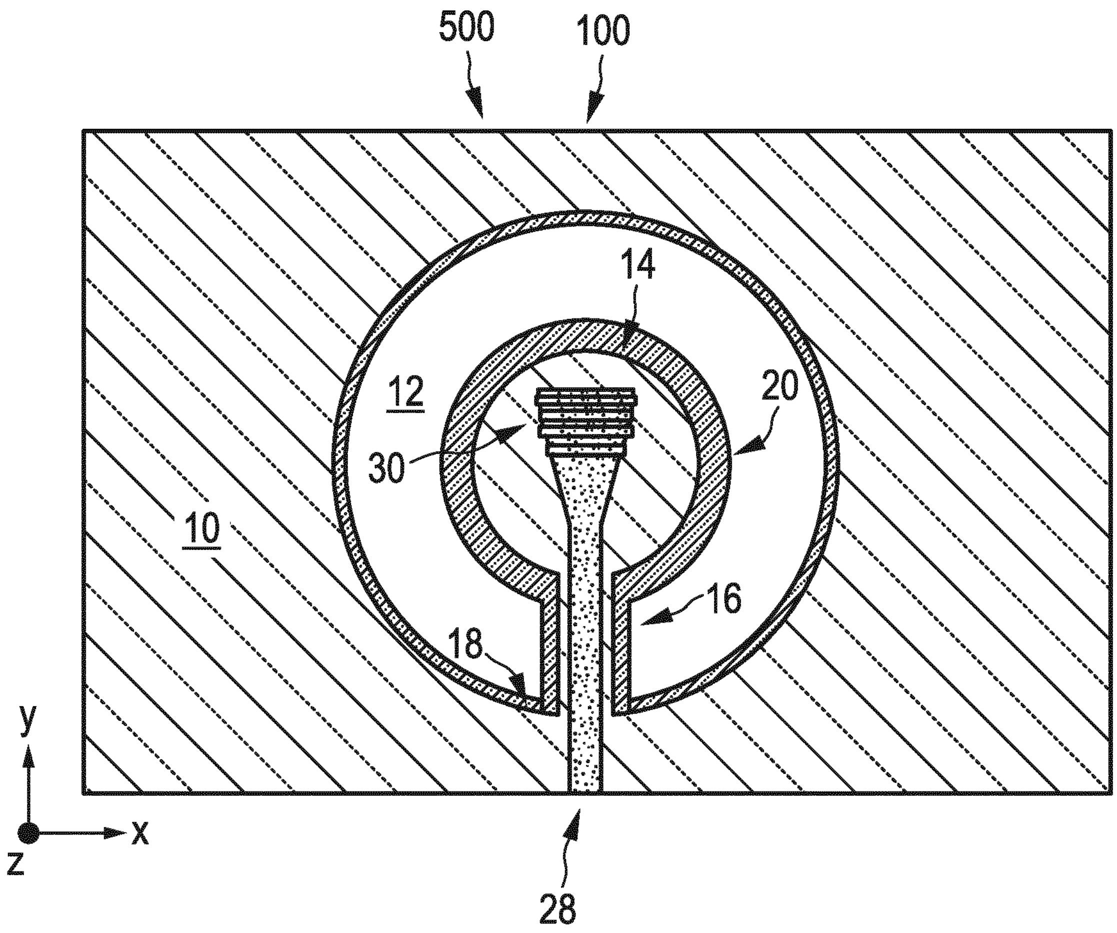
FIG. 5 shows exemplarily and schematically a horizontal cross-sectional view of a first embodiment of a PIC including the first embodiment of the bridged OTSW.

FIG. 5 shows a PIC 500 including the bridged OTSW 100 presented in FIG. 1 and a planar optical waveguide in form of planar SOI waveguide 28 arranged on the bridge 16. The planar SOI waveguide 28 is arranged directly on a top surface of the bridge 16 and extends from the Si wafer 10 to the core 14. In this embodiment, the planar SOI waveguide 28 is terminated by a coupler in form of a Bragg grating coupler 30 on the top of the core 14. This allows an effective coupling from one surface of the Si wafer 10 to the other surface of the Si wafer 10. In particular, light may be confined in the horizontal direction by the planar SOI waveguide 28 and may be coupled to the core 14. Within the core 14 the light is confined in the vertical direction as the cladding 20 made of $SiO_2$ has a lower refractive index than the core 14 made of Si. This allows effective guiding of the light to a desired position on the Si wafer 10, such that a high bandwidth can be achieved.

Due to the design of the PIC 500, an easy production is possible as the components of the PIC 500, i.e., the bridged OTSW 100 and the planar optical waveguide 28 with its Bragg grating coupler 30 can be etched directly into the Si wafer 10. In other words, a PIC may be provided which may seamlessly couple light from planar optical waveguides to integrated optical waveguides by means of diffractively structuring the substrate surface. The PIC 500 and the integrated optical waveguide are compatible with CMOS manufacturing technologies.

Figure 6:
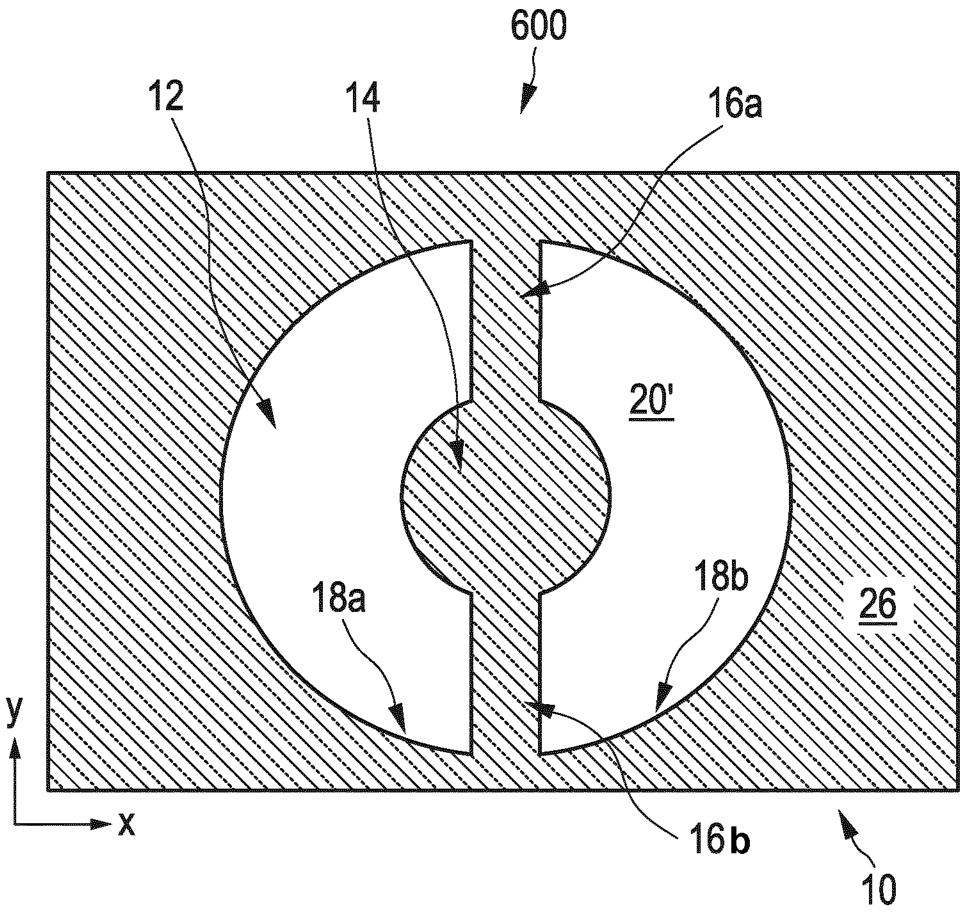
FIG. 6 shows exemplarily and schematically a horizontal cross-sectional view of a fourth embodiment of the bridged OTSW.

FIG. 6 shows a fourth embodiment of an integrated optical waveguide in form of bridged OTSW 600 in a horizontal cross-sectional view. The bridged OTSW 600 is similar to the bridged OTSW 400 presented in FIG. 4. Same reference signs are used for same features.

Figure 7:
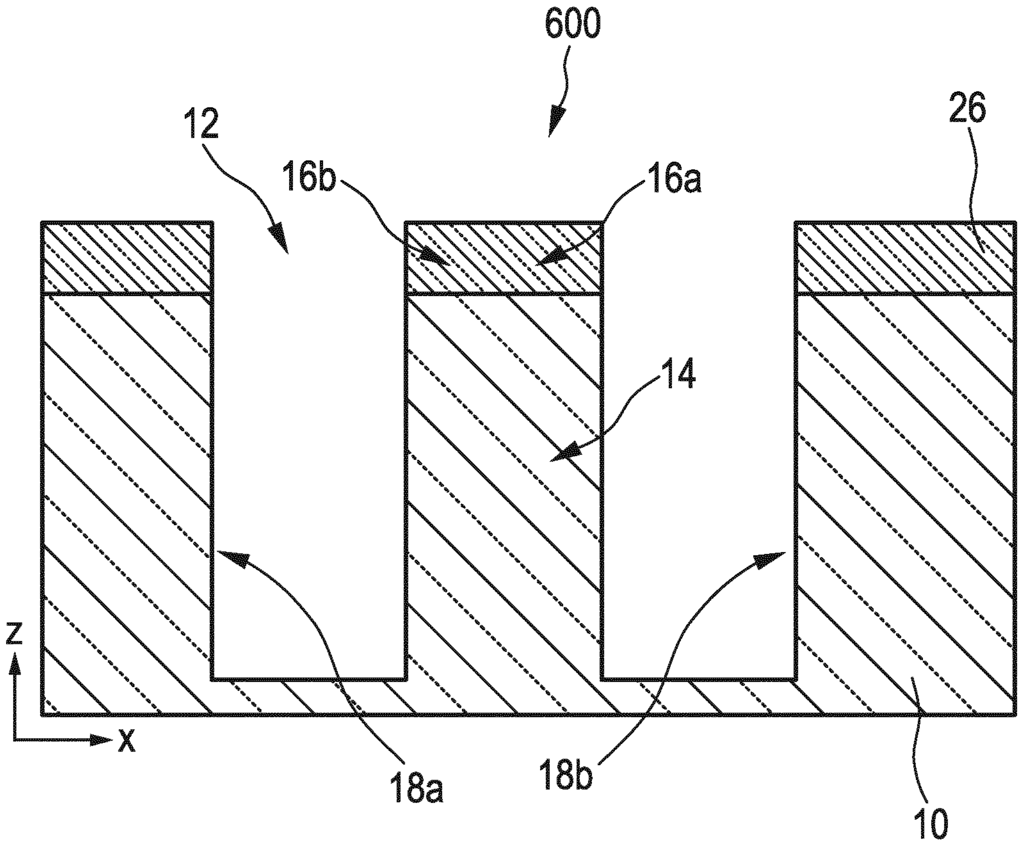
FIG. 7 shows exemplarily and schematically a vertical cross-sectional view of the fourth embodiment of the bridged OTSW.

In contrast to the bridged OTSW 400, the bridged OTSW 600 has two bridges **16*a* and 16*b*. In this case the hole 12 is divided in two sides with two sidewalls 18*a* and 18*b*. Furthermore, the impedance matching layer in form of anti-reflection coating 26 was deposited on the entire Si wafer 10 before the bridged OTSW 600 was etched into the Si wafer 10. Therefore, the core 14 and the bridges 16*a* and 16*b* have an anti-reflection coating 26 on their top, as well as the Si wafer 10 around the hole 12. FIG. 7 shows the bridged OTSW 600** in a vertical cross-sectional view.

Figure 8:
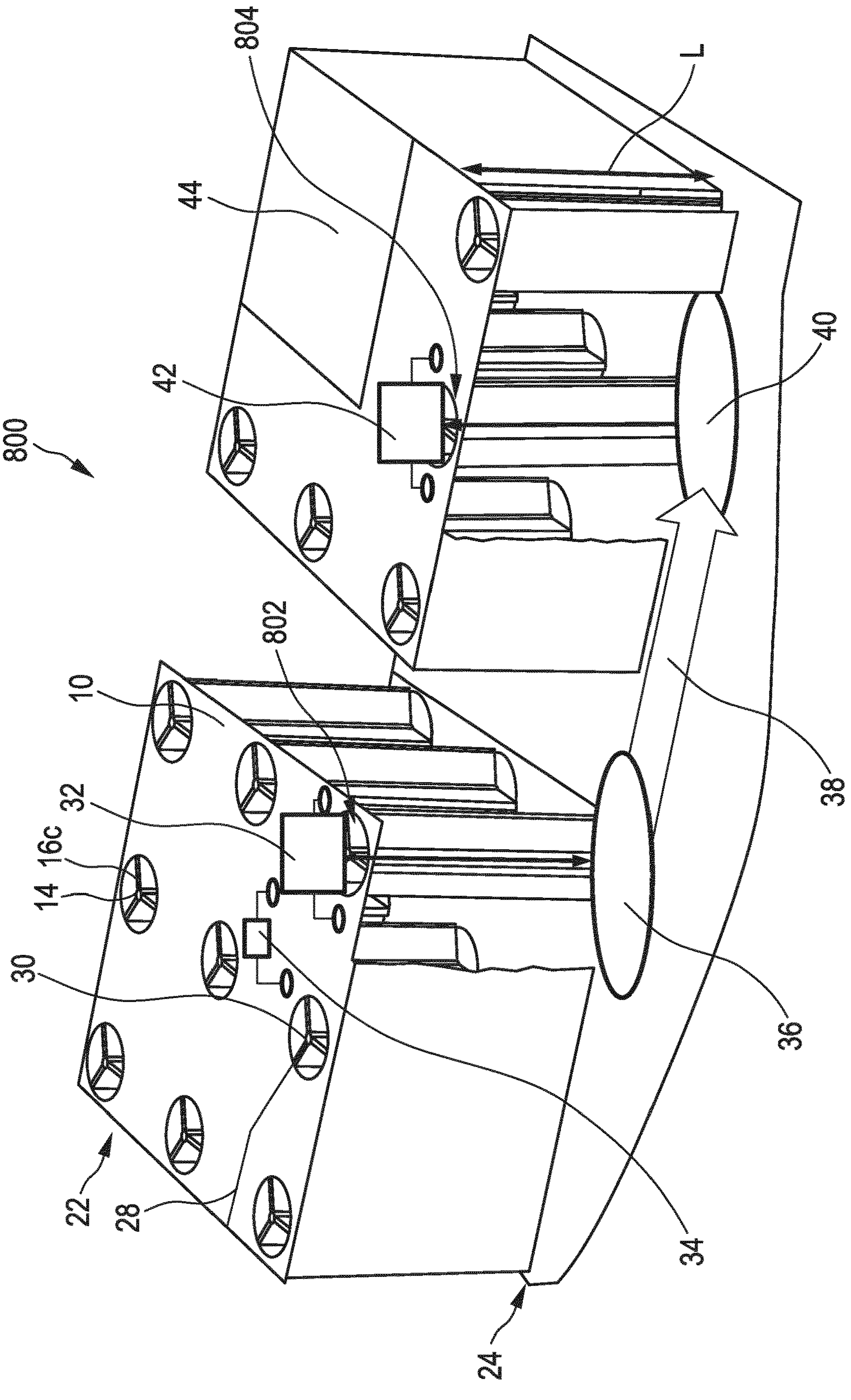
FIG. 8 shows exemplarily and schematically a perspective view of a second embodiment of a PIC including multiple bridged OTSWs and other integrated photonics components.

FIG. 8 shows a second embodiment of a PIC 800. The PIC 800 includes two integrated optical waveguides in form of bridged OTSWs 802 and 804 formed in a substrate in form of Si wafer 10. Furthermore, the PIC 800 includes optical planar waveguide in form of SOI waveguide 28, Bragg grating coupler 30, VCSEL 32, driver 34, Bragg grating coupler 36, optical planar waveguide in form of SOI waveguide 38, Bragg grating coupler 40, PD 42, and CMOS integrated circuit (IC) 44.

Each of the two bridged OTSWs 802 and 804 extends in axial direction from a first surface, i.e., top 22, of the Si wafer 10 to a second surface, i.e., bottom 24, of the Si wafer 10 over an axial length L. The axial length L corresponds to the thickness of the Si wafer 10 in this embodiment, which is 500 μm. In other embodiments, the axial length may also be, for example, between 350 μm to 750 μm, depending on a thickness of the substrate.

SOI waveguide 28 is shown exemplarily in order to indicate that the SOI waveguides 28 and 38 are supported on the bridges **16*c* of the bridged OTSWs and may extend over some distance of the Si wafer 10, e.g., between two OTSWs or even further. Furthermore, Bragg grating coupler 30 is shown exemplarily in order to indicate that the Bragg grating couplers 36 and 40 are arranged on or above, respectively, a bottom tip of the core 14 of the OTSWs 802 and 804**, respectively.

The VCSEL 32 provides an optical signal and is arranged on the top 22 of the Si wafer 10 above the core 14 of the bridged OTSW 802. The driver 34 drives the VCSEL 32 and is also arranged on the top 22 of the Si wafer 10.

The optical signal, e.g., an evanescent light wave with a certain wavelength for which the core 14 is sufficiently transparent, is provided from the VCSEL 32 to the core 14 of the bridged OTSW 802. The core 14 guides the optical signal along the vertical direction to the Bragg grating coupler 36. The Bragg grating coupler 36 couples the optical signal between the bridged OTSW 802 and the SOI waveguide 38. In particular, the Bragg grating coupler 36 allows to switch direction of the light wave from vertical to horizontal and provides the optical signal to the SOI waveguide 38 which guides the optical signal to the other Bragg grating coupler 40. The Bragg grating coupler 40 couples the optical signal between the SOI waveguide 38 and the bridged OTSW 804. In particular, the Bragg grating coupler 40 switches the direction of the light wave from horizontal to vertical and provides it to the core 14 of the bridged OTSW 804. The core 14 of the bridges OTSW 804 guides the optical signal to the PD 42 where it is received and detected. The PPD 42 is arranged on the top 22 above the core 14 of the OTSW 804. The PD 42 is connected to CMOS IC 44 which process the optical signal in order to obtain information from the optical signal.

Figure 9:
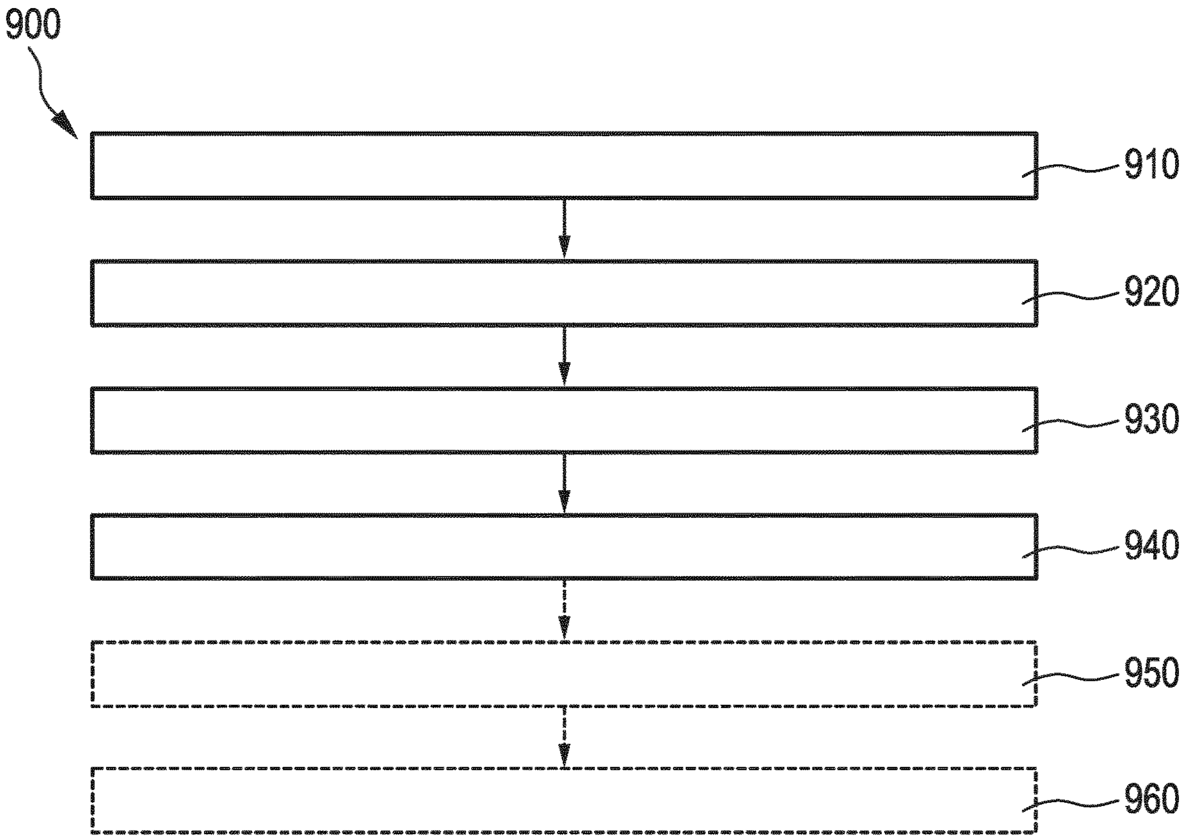
FIG. 9 shows exemplarily and schematically a flow diagram of an embodiment of a method for producing an integrated optical waveguide.

FIG. 9 shows a flow diagram of an embodiment of a method 900 for producing an integrated optical waveguide in a substrate, e.g., one of the bridged OTSWs 100, 200, 400, or 600. The substrate has a first refractive index. The substrate may be, for example, an Si wafer.

In step 910, a substrate in form of a Si wafer is provided.

In step 920, a photo mask is provided on top of the Si wafer with openings that allow to etch the integrated optical waveguide into the Si wafer.

In step 930, an anisotropic plasma process is used for etching the integrated optical waveguide in an axial direction into the substrate. In this embodiment, DRIE is used for etching and the etching is performed such that the integrated optical waveguide has a hole extending in the axial direction of the substrate. For example, cryo-etching or Bosch etching may be used. Additionally, the integrated optical waveguide has a core and a bridge that are arranged in the hole. The core is arranged in the center of the hole. The bridge extends from a sidewall of the core to a sidewall of the hole.

In other embodiments, etching the integrated optical waveguide in an axial direction into the substrate may also be performed by crystal orientation dependent etching.

Optionally, wet etching is performed in order to smoothen the sidewalls of the hole, the core, and/or the bridge.

In step 940, a surrounding material in form of a cladding is deposited on the sidewalls of the core, the hole, and the bridge. The cladding is deposited by PECVD, LPCVD, PVD, or thermal oxidation.

In this embodiment, the cladding partly surrounds the sidewall of the core and the hole, namely at the circumference which is not connected to the bridge.

The cladding has a lower refractive index than the Si wafer and such that a refractive index difference between the core and the cladding allows to guide light within the core.

In an optional step 950, the integrated optical waveguide is integrated into a PIC by etching the bridge in order to provide a planar optical waveguide on the bridge which extends from the Si wafer area around the hole to the core.

In optional step 960, additionally, the core is etched at its top in a manner to diffractively structure its top in order to provide a coupler configured for coupling an optical signal into the integrated optical waveguide from the planar optical waveguide.

Figure 10:
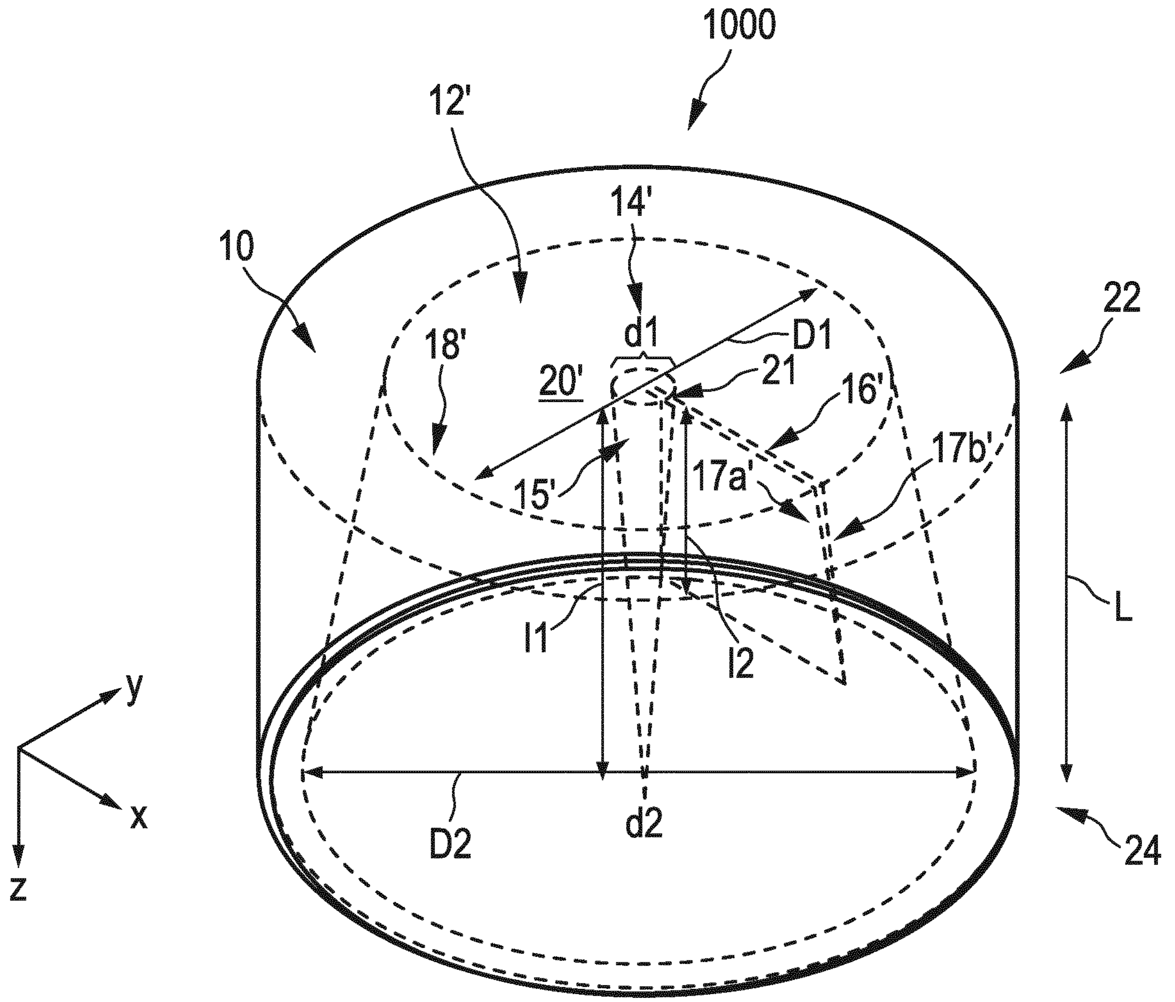
FIG. 10 shows exemplarily and schematically a perspective view of a fifth embodiment of a bridged OTSW.

FIG. 10 shows a perspective view of a fifth embodiment of an integrated optical waveguide in form of bridged OTSW 1000. The bridged OTSW 1000 is formed in a substrate in form of Si wafer 10.

The bridged OTSW 1000 includes a hole 12', a core 14', a bridge 16', and a surrounding material formed by air 20'. The hole 12', the core 14', and the bridge 16' extend in an axial direction z of the Si wafer 10. In this embodiment, the core 12' and the bridge 16' are made of Si, i.e., they are made of the same material as the substrate 10. The bridge 16' extends from a sidewall 15' of the core 14' to a sidewall 18' of the hole 12'. The sidewall 15' of the core 14' is partly surrounded by air 20'. The core 14' is not surrounded by air 20' at its junction 21 to the bridge 16'.

In this embodiment, the sidewall 18' of the hole 12', the sidewall 15' of the core 14', and sidewalls 17*a*' and 17*b*' of the bridge 16' are tapered sidewalls, i.e., they are oblique to the axial direction z. Therefore, a diameter D1 of the hole 12' at a top 22 of the Si wafer 10 is smaller than a diameter D2 at a bottom 24 of the Si wafer 10. Vice versa, a diameter d1 of the core 14' is larger at the top 22 than a diameter d2 at the bottom 24. This allows providing mode size conversion.

An axial length l1 of the core 14' and an axial length L of the hole 12' are identical, i.e., the core 14' extends from the top 22 to the bottom 24. In contrast, the sidewalls 17*a*' and 17*b*' have a tapering angle which causes the bridge 16' not to extend over the entire axial length l1 or L, respectively. An axial length l2 of the bridge 16' is shorter than the axial length l1 of the core 14' such that the bridge 16' terminates after the axial length l2 forming a suspended bridge. In other words, the bridged OTSW 1000 is a tapered OTSW with a suspended bridge.

Since the core 14' is made of Si and Si has a higher refractive index than the air 20' surrounding the core 14' light can be guided within the core 14'.

Figure 11:
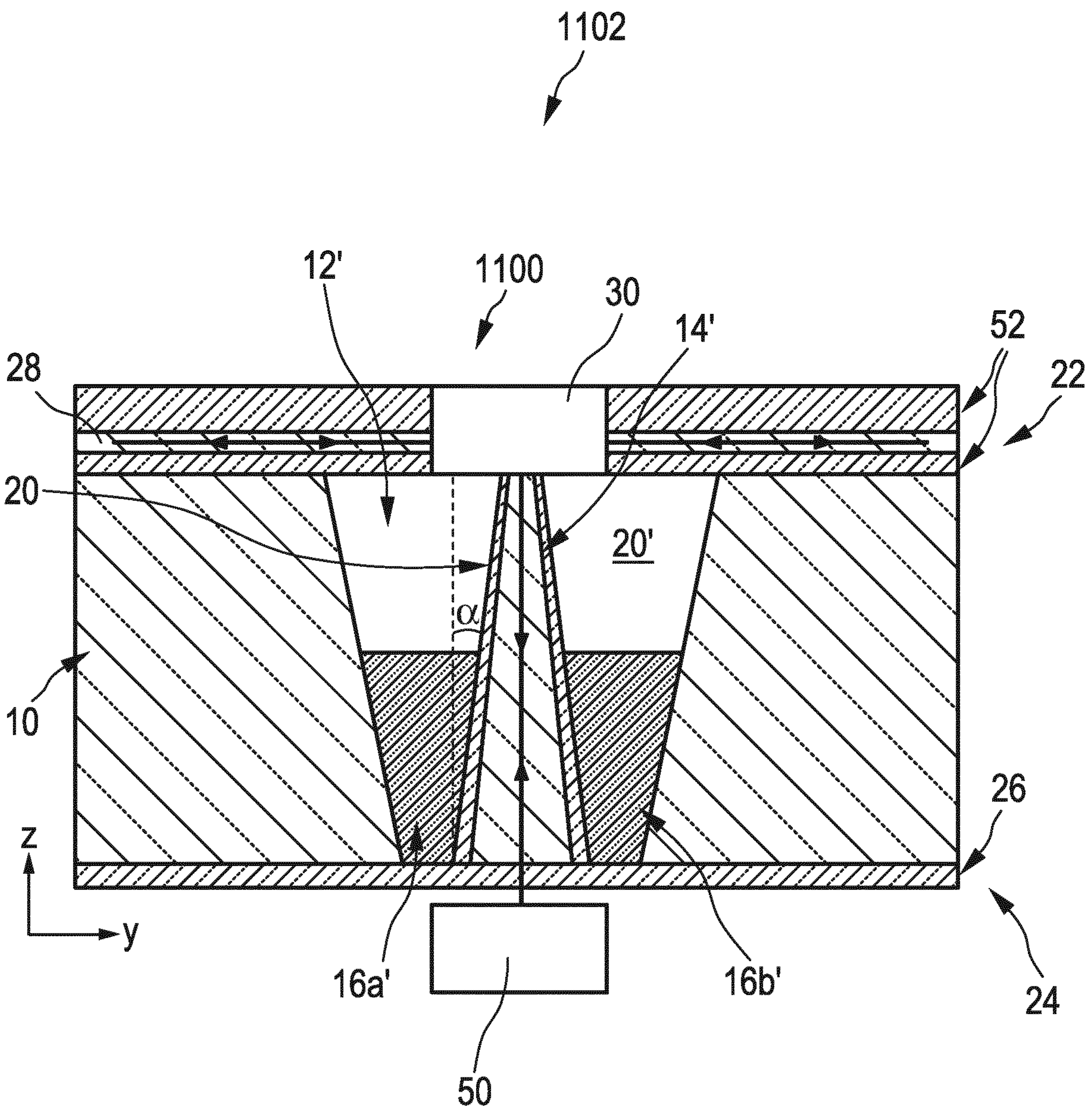
FIG. 11 shows exemplarily and schematically a vertical cross-sectional view of a third embodiment of a PIC including a sixth embodiment of a bridged OTSW.

FIG. 11 shows exemplarily and schematically a vertical cross-sectional view of a third embodiment of a PIC 1102 including a sixth embodiment of an integrated optical waveguide in form of a bridged OTSW 1100. The PIC 1102 is shown and used in an upside-down orientation compared to its orientation during production. The bridged OTSW 1100 is similar to the bridged OTSW 1000, namely it is also a tapered OTSW with suspended bridges. Same reference signs refer to identical features.

Additionally, the PIC 1102 includes a coupler in form of a Bragg grating coupler 30 arranged above the core 14' of the bridged OTSW 1100 on the top 22 of the Si wafer 10. The Bragg grating coupler 30 is connected to a planar optical waveguide 28 extending in a passivation layer 52 arranged on the Si wafer 10. The passivation layer 52 may be, for example, an oxide, such as $SiO_2$ or a nitride, such as $Si_3N_4$. Furthermore, an impedance matching layer in form of anti-reflection coating 26 is deposited on the bottom 24 of the Si wafer 10 and a photonic transceiver element 50 is arranged above the core 14' on the bottom 24. The photonic transceiver element 50 includes a VCSEL for providing an optical signal in form of an evanescent light wave and a PD for receiving optical signals. The photonic transceiver element 50 may be connected to further processing components, e.g., a CMOS IC (not shown).

In this embodiment, the hole 12' has a larger diameter at the top 22 of the Si wafer 10 than at its bottom 24 while the core 14' has a smaller diameter at the top 22 than at its bottom 24. The two bridges 16*a*' and 16*b*' are tapered and thinner than the core 14' such that they terminate at a fraction of the axial length of the core 14' and form suspended bridges leaving the tip of the core 14' completely surrounded by the cladding 20. The tapering angle or slope, respectively, of the sidewall 15' of the hole 12' is at an angle α with respect to the axial direction z.

Light may be either injected into the core 14' from the bottom 24 by the photonic transceiver element 50 or outcoupled by the Bragg grating coupler 30 of the planar optical waveguide 28. Light may be bidirectionally deflected on the surface by the Bragg grating coupler 30. The Bragg grating coupler may also be replaced by any other coupler. If the coupler is diffractive, light can be bidirectionally deflected. If the coupler is an unidirectional coupler, such as a mirror or prism coupler, unidirectional deflection can be achieved. This may also be achieved, if a reflective element terminates one side of the integrated optical waveguide.

Figure 12:
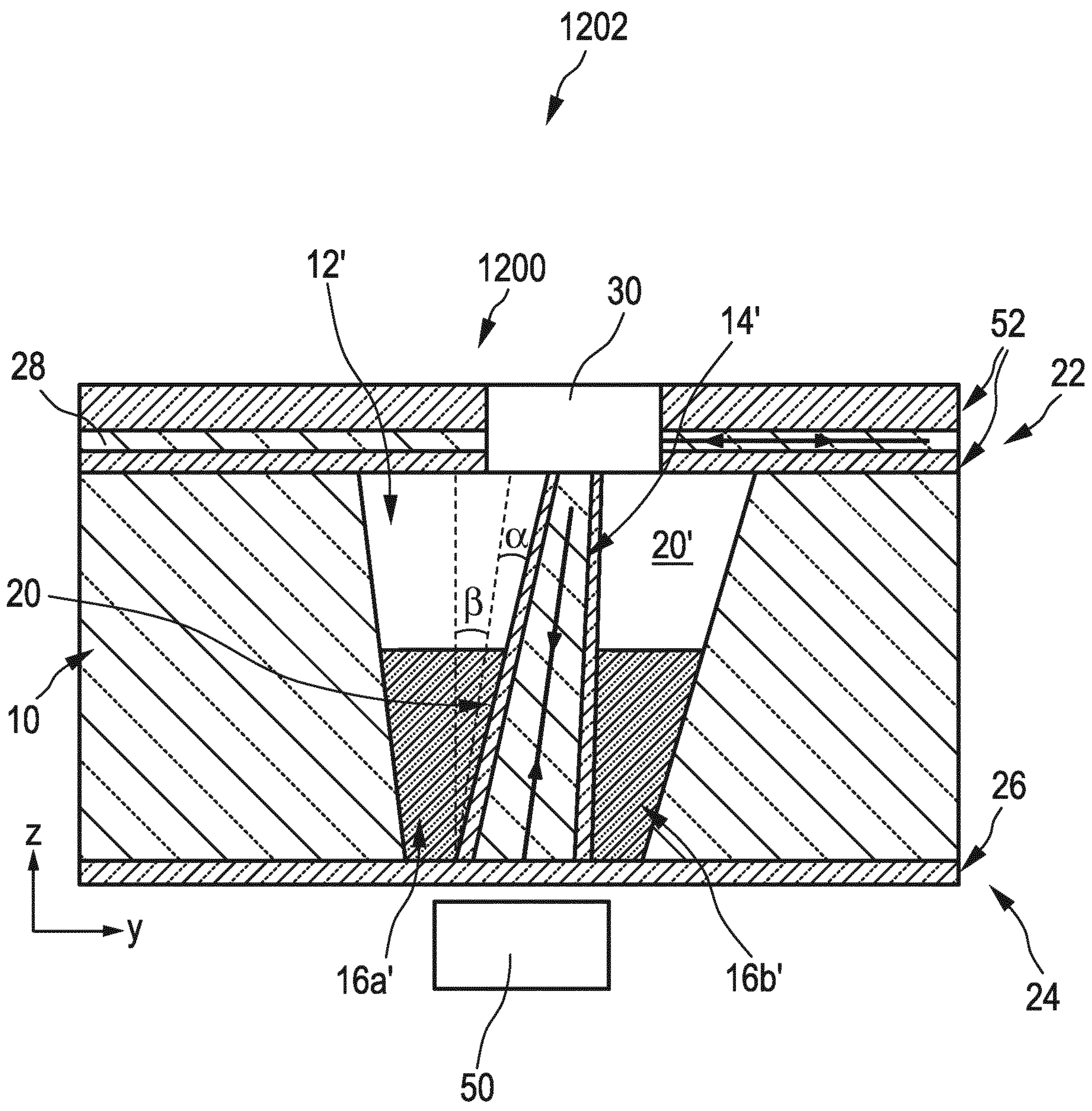
FIG. 12 shows exemplarily and schematically a vertical cross-sectional view of a fourth embodiment of a PIC including a seventh embodiment of a bridged OTSW.

FIG. 12 shows a vertical cross-sectional view of a fourth embodiment of a PIC 1202 including a seventh embodiment of an integrated optical waveguide in form of a bridged OTSW 1200. The PIC 1202 is shown and used in an upside-down orientation compared to its orientation during production. The bridged OTSW 1200 is similar to the bridged OTSW 1100, namely it is also a tapered OTSW with suspended bridges. Same reference signs refer to identical features.

In contrast to the bridged OTSW 1100, the bridged OTSW 1200 has an oblique form. In this embodiment, the Si wafer 10 is etched at an angle β with respect to the axial direction z. Furthermore, a tapering angle of the sidewall 15' of the hole 12' is at an angle α with respect to the axial direction z. The bridged OTSW 1200 may be produced, for example, based on lying the Si wafer 10 slightly tilted on a substrate holder which will be introduced in a plasma etching device over a planar electrode. The bridged OTSW 1200 allows to couple light with a stronger directionality in the planar optical waveguide 28. This embodiment, is of particular interest in the case of diffractive couplers. The photonic transceiver element 50 may include a tilted transmitter or source, respectively, of optical signals, such as a tilted VCSEL.

Figure 13:
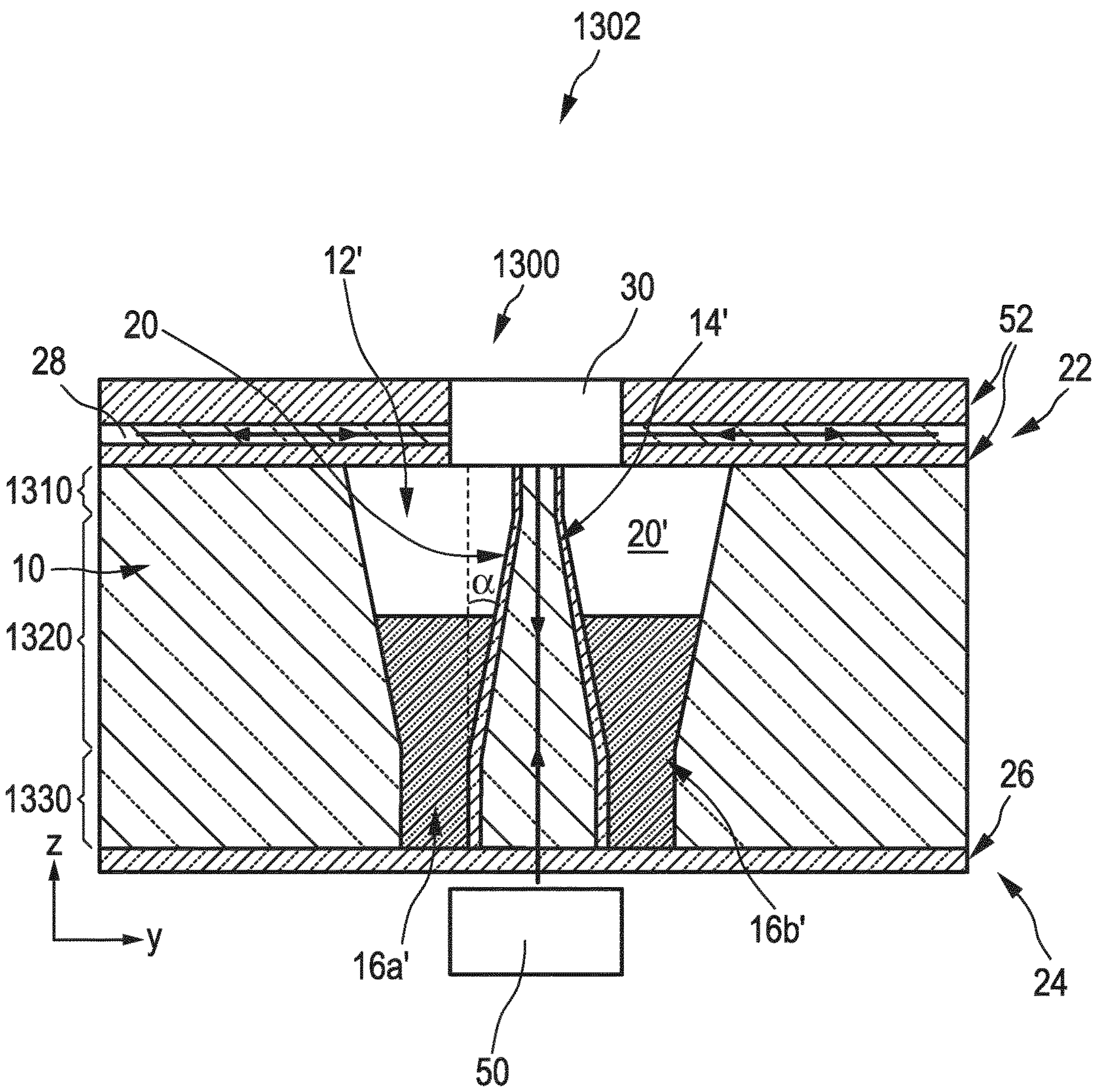
FIG. 13 shows exemplarily and schematically a vertical cross-sectional view of a fifth embodiment of a PIC including an eighth embodiment of a bridged OTSW.

FIG. 13 shows a vertical cross-sectional view of a fifth embodiment of a PIC 1302 including an eighth embodiment of an integrated optical waveguide in form of a bridged OTSW 1300. The PIC 1302 is shown and used in an upside-down orientation compared to its orientation during production. The bridged OTSW 1300 is similar to the bridged OTSW 1100, namely it is also a tapered OTSW with suspended bridges. Same reference signs refer to identical features.

In contrast to the bridged OTSW 1100, the bridged OTSW 1300 includes an initial vertical section 1310, a tapered section 1320, and a final vertical section 1330. The initial vertical section 1310 and the final vertical section 1330 are parallel to the axial direction z. The tapered section 1320 is oblique to the axial direction z. The bridged OTSW 1300 is produced by varying processing parameters during production of the bridged OTSW 1300 such that the sidewalls of the hole 12', the core 14', as well as the bridges **16*a*' and 16*b*' are carefully controlled. Providing the bridged OTSW 1300 with a non-tapered or vertical, respectively, initial vertical section 1310 and final vertical section 1330** may allow improving coupling efficiency both at its input and output.

Figure 14:
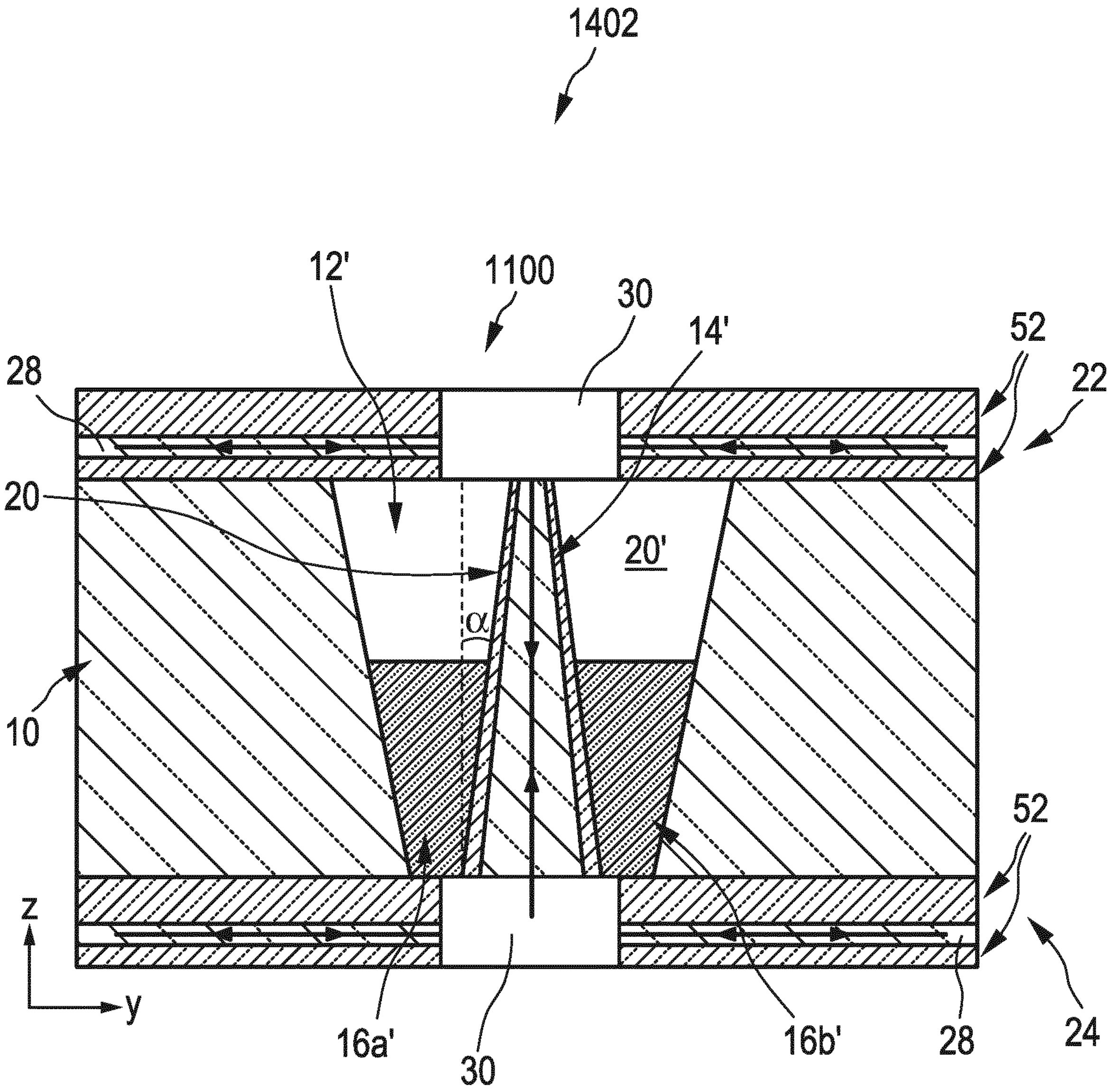
FIG. 14 shows exemplarily and schematically a vertical cross-sectional view of a sixth embodiment of a PIC including the nineth embodiment of a bridged OTSW.

FIG. 14 shows a vertical cross-sectional view of a sixth embodiment of a PIC 1402 including the bridged OTSW 1100. The PIC 1402 is shown and used in an upside-down orientation compared to its orientation during production. The PIC 1402 is similar to the PIC 1102, namely it also includes a tapered OTSW with suspended bridges. Same reference signs refer to identical features.

In contrast to the PIC 1102, the PIC 1402 has another planar optical waveguide 28 embedded in passivation layer 52 at the bottom 24 which includes another Bragg grating coupler 30 above the core 14' at the bottom 24.

Light may be internally coupled and outcoupled between the top 22 and the bottom 24 of the Si wafer 10. The planar optical waveguides 28 may be connected to further photonic components, e.g., PDs which may be connected to further ICs, such as CMOS ICs. One or both of the couplers may also be replaced by a photonic transceiver element or an integrated electro optical element such as a laser or a detector.

Figure 15:
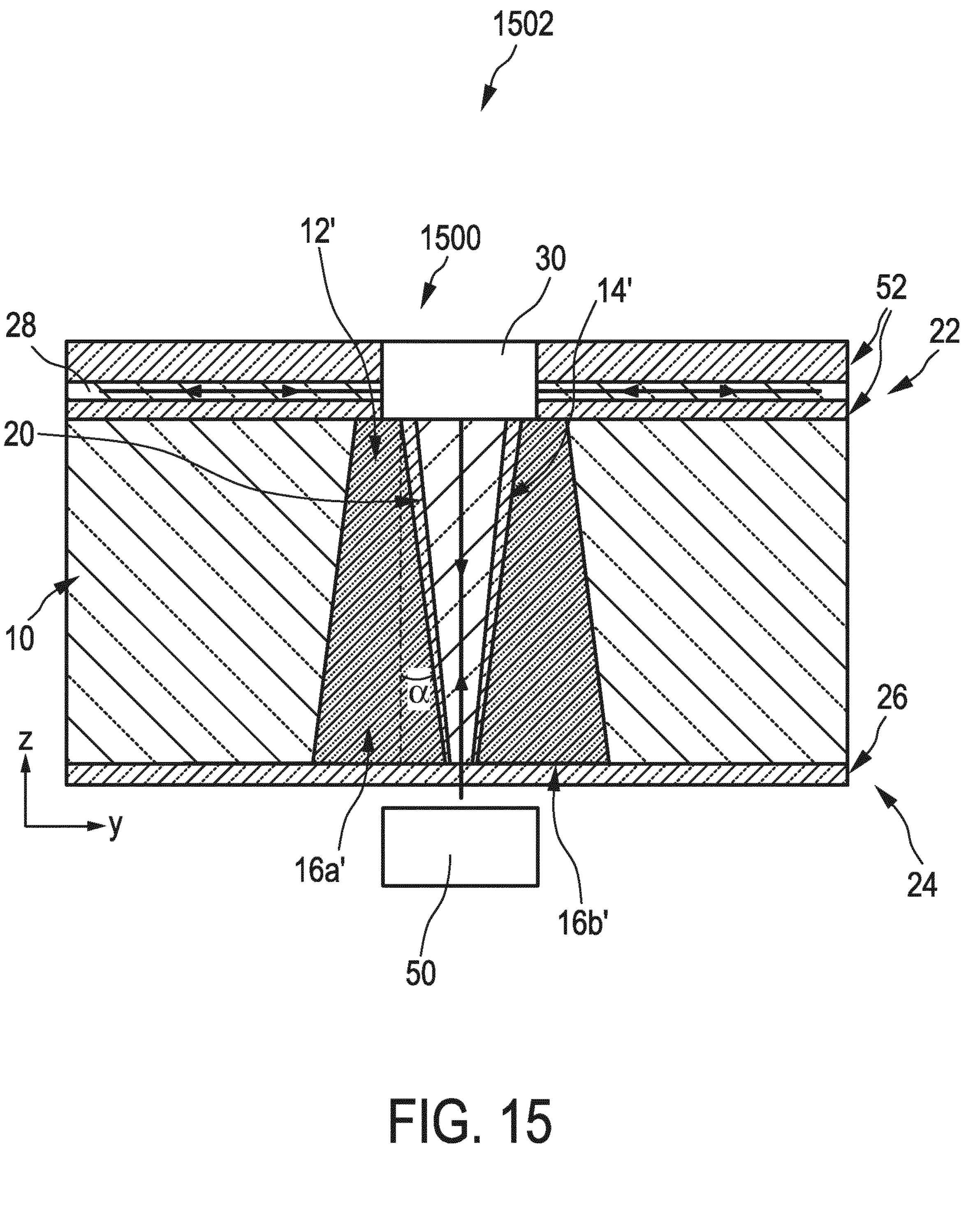
FIG. 15 shows exemplarily and schematically a vertical cross-sectional view of a seventh embodiment of a PIC including a nineth embodiment of a bridged OTSW.

FIG. 15 shows a vertical cross-sectional view of a seventh embodiment of a PIC 1502 including a tenth embodiment of an integrated optical waveguide in form of a bridged OTSW 1500. The PIC 1502 is shown and used in an upside-down orientation compared to its orientation during production. The bridged OTSW 1500 is similar to the bridged OTSW 1100, namely it is also a tapered OTSW with bridges. Same reference signs refer to identical features.

In contrast to the bridged OTSW 1100, the bridged OTSW 1500 has an inverted tapering, i.e., a positively tapered sidewall of the hole and a negatively tapered sidewall of the core 14' which results in a negatively tapered integrated optical waveguide. The diameter of the hole 12' at the top 22 is smaller than its diameter at the bottom 24 and vice versa for the core 14', i.e., its diameter at the top 22 is larger than its diameter at the bottom 24. Furthermore, the bridges **16*a*' and 16*b*' of the bridged OTSW 1500** are not suspended.

Because of the positively tapered sidewall of the hole 12', the bridges **16*a*' and 16*b*', as well as the core 14' at the masked side of the Si wafer 10 during production, i.e., bottom 24**, can have a very small width limited not by process constraints, but only by photolitho-graphic constraints.

Figure 16A:
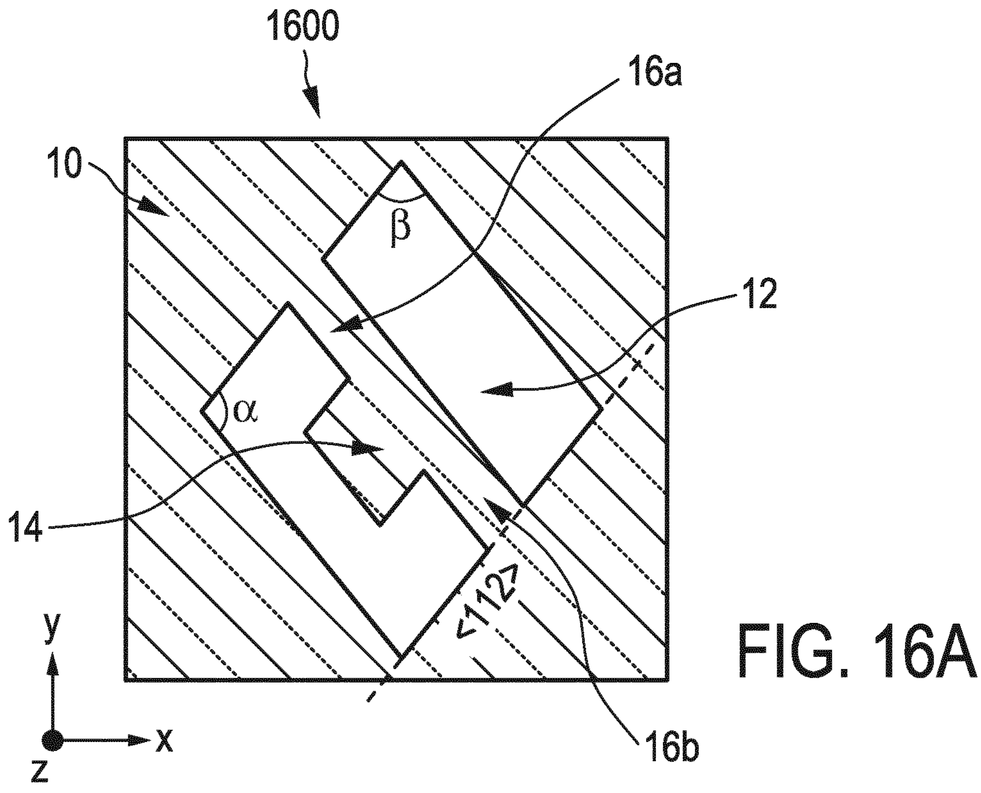
FIG. 16A shows exemplarily and schematically a horizontal cross-sectional view of a tenth embodiment of a bridged OTSW.

FIG. 16A shows a horizontal cross-sectional view of a tenth embodiment of an integrated optical waveguide in form of bridged OTSW 1600. A rectangular hole 12 is etched into substrate in form of Si wafer 10 together with a rectangular core 14 arranged in a center of the hole 12, and with bridges **16*a* and 16*b* connecting sidewalls of the hole 12 and the core 14**.

In this embodiment, the geometry of the rectangular core 14 and its surrounding hole 12, follows the <112> crystallographic directions of the Si wafer 10 with the (110) surface exposed. As a consequence the rectangular hole 12 can be anisotropically etched and subsequently polished by a wet etching process which allows exposing the corresponding vertical (111) crystallographic planes that lie below the <112> directions. Angles α and β are respectively of 109.47° and 70.52°. In this embodiment, the bridged OTSW 1600 has a rib waveguide form with the two bridges **16*a* and 16*b***. The integrated optical waveguide may also have a different number of bridges and/or a different shape.

Figure 16B:
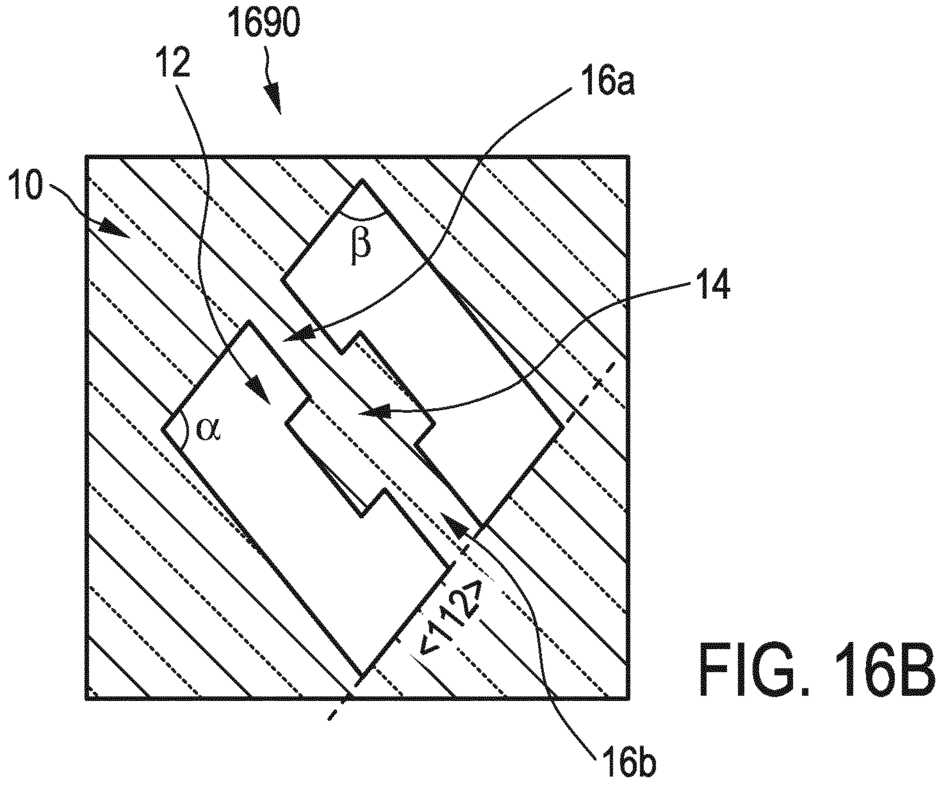
FIG. 16B shows exemplarily and schematically a horizontal cross-sectional view of an eleventh embodiment of a bridged OTSW.

FIG. 16B shows schematically a horizontal a cross-sectional view of an eleventh embodiment of an integrated optical waveguide in form of bridged OTSW 1690. The bridged OTSW 1690 is similar to the bridged OTSW 1600. The bridged OTSWs 1600 and 1690 differentiate themselves only based on their form.

The bridged OTSW 1690 has a rhomboidal waveguide form and is connected with two bridges **16*a* and 16*b***.

Figure 17A:
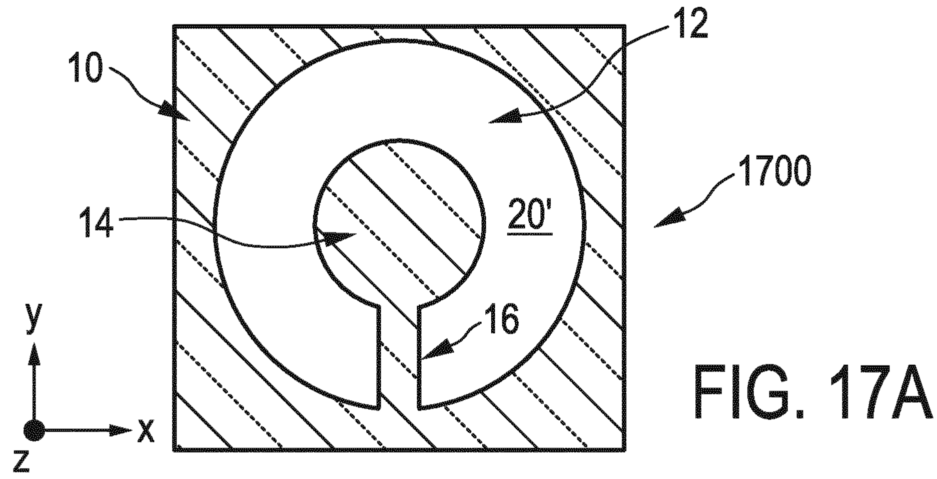
FIG. 17A shows exemplarily and schematically a horizontal cross-sectional view of a twelfth embodiment of a bridged OTSW.

FIG. 17A shows a horizontal cross-sectional view of a twelfth embodiment of an integrated optical waveguide in form of a bridged OTSW 1700. The bridged OTSW 1700 is similar to the bridged OTSW 100. Same reference signs refer to identical features. In contrast to the bridged OTSW 100, the bridged OTSW 1700 has no cladding. Instead air 20' surrounds the core 14 as surrounding material.

Figure 17B:
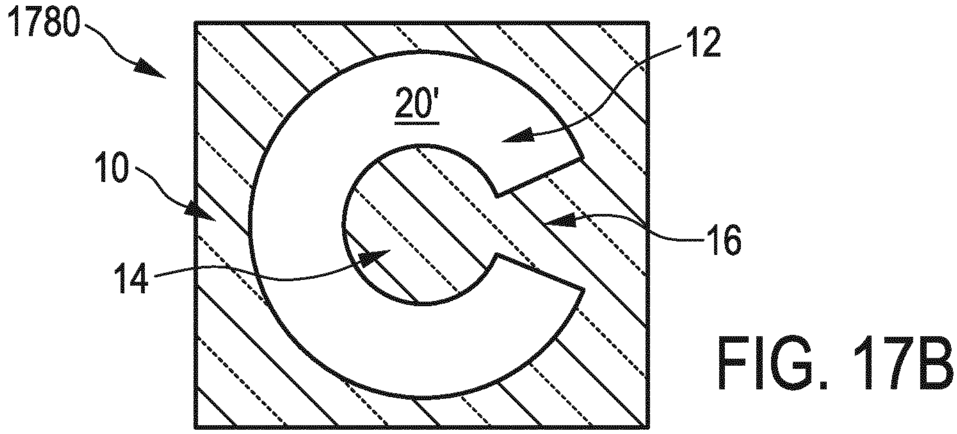
FIG. 17B shows exemplarily and schematically a horizontal cross-sectional view of a thirteenth embodiment of a bridged OTSW.

FIG. 17B shows a horizontal cross-sectional view of a thirteenth embodiment of an integrated optical waveguide in form of a bridged OTSW 1780. The bridged OTSW 1780 is similar to the bridged OTSW 1700. Same reference signs refer to identical features. Bridged OTSW 1700 and bridged OTSW 1780 only differentiate themselves based on a shape of bridge 16.

Figure 17C:
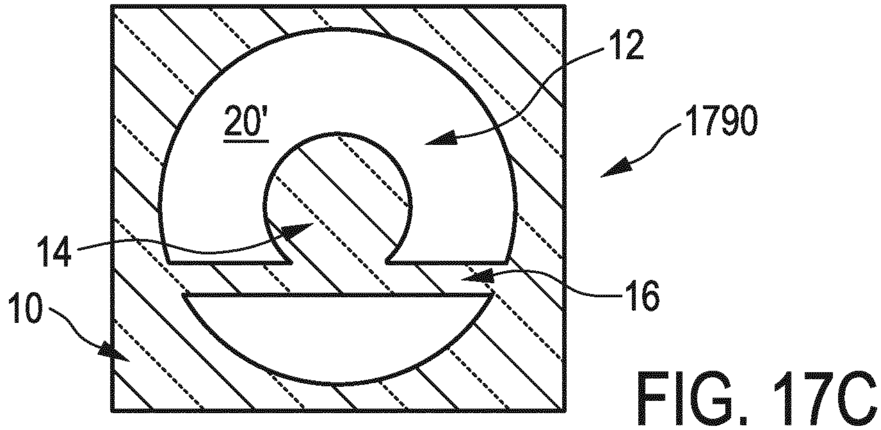
FIG. 17C shows exemplarily and schematically a horizontal cross-sectional view of a fourteenth embodiment of a bridged OTSW.

FIG. 17C shows a horizontal cross-sectional view of a fourteenth embodiment of an integrated optical waveguide in form of a bridged OTSW 1790. The bridged OTSW 1790 is similar to the bridged OTSW 1700. Same reference signs refer to identical features. Bridged OTSW 1700 and bridged OTSW 1790 only differentiate themselves based on a shape of bridge 16. In particular, bridge 16 of bridged OTSW 1790 is arranged tangentially to the core 14, such that it divides the hole 12 into two spaces.

Figure 18B:
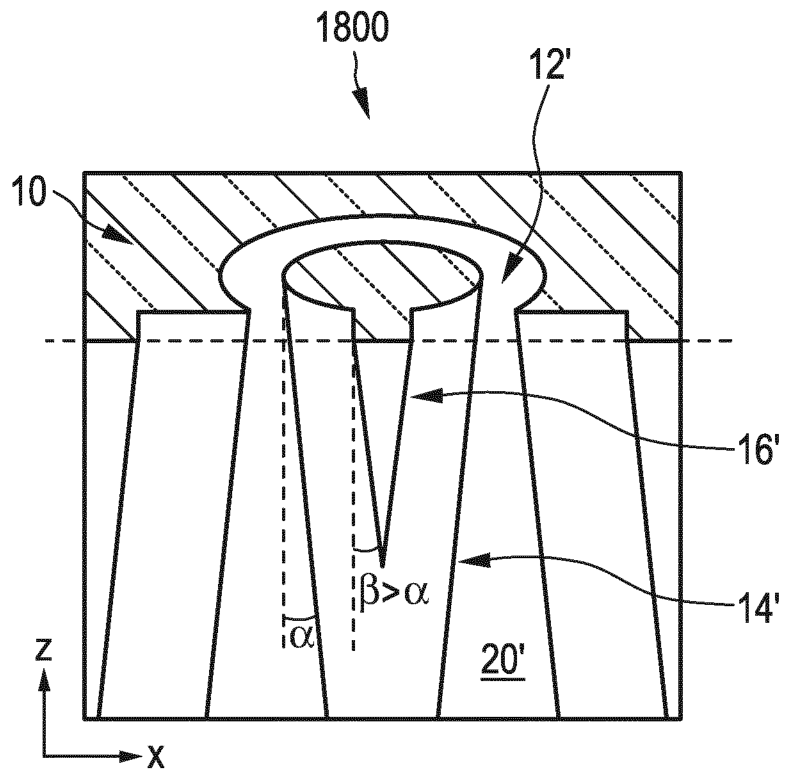
FIG. 18B shows exemplarily and schematically a perspective cross-sectional view of the fifteenth embodiment of the bridge OTSW.
Figure 18A:
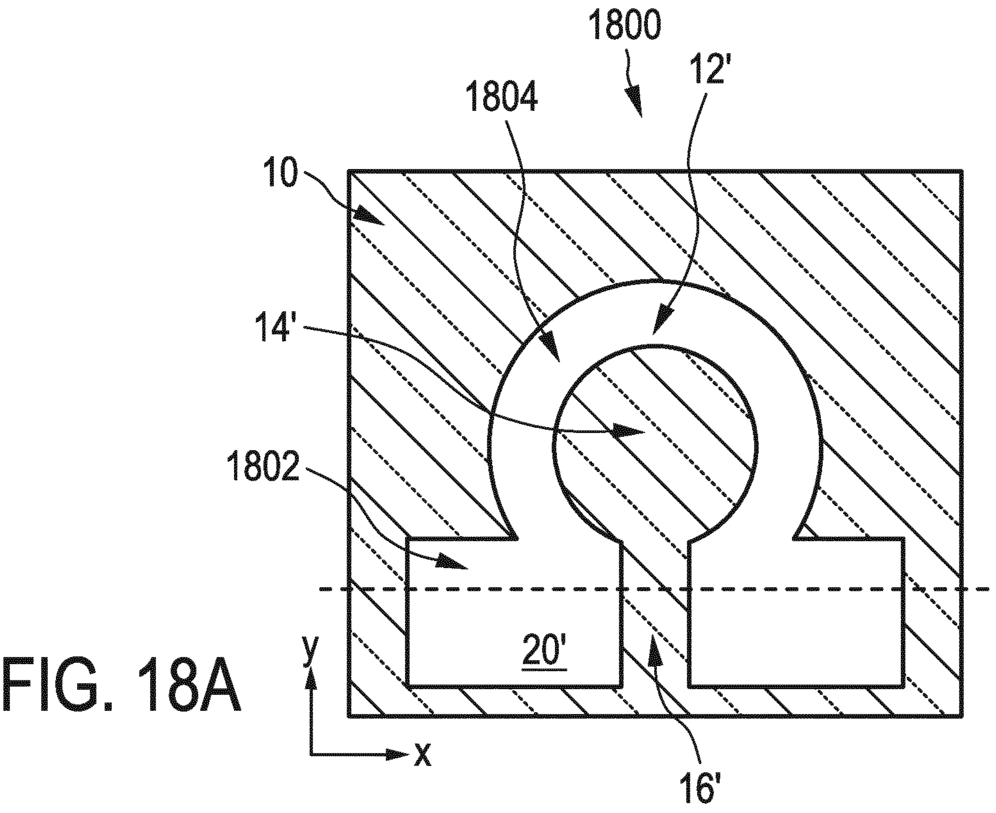
FIG. 18A shows exemplarily and schematically a horizontal cross-sectional view of a fifteenth embodiment of a bridged OTSW.

FIG. 18A shows a horizontal cross-sectional view of a fifteenth embodiment of an integrated optical waveguide in form of a bridged OTSW 1800. The bridged OTSW 1800 is similar to the bridged OTSW 1000. Same reference signs refer to identical features. Bridged OTSW 1800 is a tapered OTSW with a suspended bridge.

In contrast to the bridged OTSW 1000, the bridged OTSW 1800 has a first hole section 1802 around the bridge 16' and a second hole section 1804 around the core 14'. The bridges OTSW 1800 has different tapering angles α and β for the sidewalls of the core 14' and the bridge 16'. The first hole section 1802 is larger in size compared to the second hole section 1804 around the core 1804. Consequently, an angular ion distribution during the etching process for producing the bridged OTSW 1800 is larger around the bridge 16' in the first hole section 1802 than around the core 14' in the second hole section 1804. Hence, the sidewalls of the bridge 16' are more strongly tapered than the sidewall of the core 14'. In this way axial length of the suspended bridge 16' can be finely tuned.

FIG. 18B a perspective cross-sectional view of the bridged OTSW 1800 presented in FIG. 18A with the different tapering angles α and β.

In summary, an integrated optical waveguide is presented which has a core linked to the surrounding substrate material via one or more bridges and which is etched into the substrate material, e.g., bulk Si or a SOI wafer.

In particular, the present invention regards an integrated optical waveguide formed in a substrate. The integrated optical waveguide includes a hole, a core, and one or more bridges. The hole extends in an axial direction of the substrate. The core is made of the same material as the substrate, arranged in the hole, and extends in the axial direction. The core has a first refractive index and a sidewall which is at least partly surrounded by a surrounding material which has a second refractive index which is lower than the first refractive index and such that a refractive index difference between the first refractive index and the second refractive index allows to guide light within the core. The one or more bridges extend from the sidewall of the core to a sidewall of the hole. The one or more bridges may also be made of the same material as the substrate. Furthermore, one or more of the sidewalls of the core, the hole, and the one or more bridges may be tapered sidewalls which include a section which is oblique to the axial direction. Additionally an axial length of one or more of the one or more bridges may be shorter than an axial length of the core.

What is claimed is:

1. An integrated optical waveguide formed in a substrate, the integrated optical waveguide comprising:

a hole extending in an axial direction of the substrate from a top surface of the substrate to a bottom surface of the substrate;

a core arranged in the hole and extending in the axial direction, the core having a first refractive index and a sidewall;

a surrounding material at least partly surrounding the sidewall and having a second refractive index which is lower than the first refractive index, a difference between the first refractive index and the second refractive index guides light within the core, wherein the core is made of a same material as the substrate; and one or more bridges extending from the sidewall of the core to a sidewall of the hole.

2. The integrated optical waveguide according to claim 1, wherein the one or more bridges are made of the same material as the substrate.

3. The integrated optical waveguide according to claim 1, wherein one or more of the sidewall of the core, the sidewall of the hole, and sidewalls of the one or more bridges are tapered sidewalls which include a section which is oblique to the axial direction.

4. The integrated optical waveguide according to claim 1, wherein the surrounding material includes a cladding covering at least one of the sidewall of the hole, the sidewall of the core, and sidewalls of one or more bridges.

5. The integrated optical waveguide according to claim 1, wherein an axial length of at least one of the one or more bridges is less than an axial length of the core.

6. The integrated optical waveguide according to claim 1, wherein at least one of the hole and the core has an oblique cylinder form.

7. The integrated optical waveguide according to claim 1, wherein a roughness of one or more of the sidewall of the hole, the sidewall of the core, and sidewalls of the one or more bridges is reduced by:

using crystal orientation dependent etching; or using deep reactive ion etching.

8. The integrated optical waveguide according to claim 1, wherein an impedance matching layer is arranged on top of the core.

9. A photonic integrated circuit, comprising:

the integrated optical waveguide according to claim 1, and a planar optical waveguide arranged on at least one of the one or more bridges and extending from the substrate to the core.

10. The photonic integrated circuit according to claim 9, wherein the planar optical waveguide terminates at a coupler disposed on top of the core.

11. A photonic integrated circuit, comprising:

two integrated optical waveguides according to claim 1, both formed in the substrate, wherein each of the two integrated optical waveguides extends in the axial direction from a first surface of the substrate to a second surface of the substrate;

a vertical-cavity surface-emitting laser (VCSEL) configured for providing an optical signal and arranged on the first surface of the substrate above the core of a first one of the two integrated optical waveguides;

a photodetector configured for receiving the optical signal and arranged on the first surface of the substrate above the core of a second one of the two integrated optical waveguides;

a driver configured for driving the VCSEL and arranged on the first surface of the substrate; and two couplers, each arranged on the second surface of the substrate above the core of a respective one of the two integrated optical waveguides, wherein each of the couplers is configured for coupling an optical signal between one of the two integrated optical waveguides and a planar optical waveguide arranged on the second surface of the substrate which connects the two couplers.

12. A method for producing an integrated optical waveguide in a substrate, the substrate having a first refractive index, comprising:

etching the integrated optical waveguide into the substrate with an anisotropic plasma process in an axial direction such that:

a hole extends in the axial direction of the substrate from a top surface of the substrate to a bottom surface of the substrate;

a core of the substrate is arranged in the hole and extends in the axial direction, the core having a sidewall;

a surrounding material at least partly surrounding the sidewall and having a second refractive index which is lower than the first refractive index, a difference between the first refractive index and the second refractive index guides light within the core; and one or more bridges extending from the sidewall of the core to a sidewall of the hole.

13. The method according to claim 12, wherein the method further comprises providing the surrounding material including a material deposited by:

plasma enhanced chemical vapor deposition, deposited by low pressure chemical vapor deposition, deposited by physical vapor deposition, or grown by thermal oxidation.

14. The method according to claim 12, further comprising at least one of:

etching at least one of the one or more bridges in order to provide a planar optical waveguide on the one or more bridges; and etching the core to form a diffractive structure on a surface of the core that functions as a coupler configured for coupling an optical signal into the integrated optical waveguide.

15. The method according to claim 12, wherein etching the integrated optical waveguide in the axial direction into the substrate is performed by crystal orientation dependent etching or deep reactive ion etching.

* * * * *